(12) United States Patent
Xu et al.

(10) Patent No.: US 8,531,408 B2
(45) Date of Patent: Sep. 10, 2013

(54) PSEUDO MULTI-DOMAIN DESIGN FOR IMPROVED VIEWING ANGLE AND COLOR SHIFT

(75) Inventors: Ming Xu, Cupertino, CA (US); Cheng Chen, Cupertino, CA (US); Mingxia Gu, Santa Clara, CA (US); John Z. Zhong, Cupertino, CA (US); Shawn Robert Gettemy, San Jose, CA (US); Shih Chang Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 848 days.

(21) Appl. No.: 12/371,409

(22) Filed: Feb. 13, 2009

(65) Prior Publication Data

US 2010/0207862 A1      Aug. 19, 2010

(51) Int. Cl.
G09G 3/36     (2006.01)

(52) U.S. Cl.
USPC ........... 345/173; 349/129; 349/139; 349/141; 349/142; 349/143

(58) Field of Classification Search
USPC ................. 345/173; 349/141, 139, 143, 142, 349/129
See application file for complete search history.

(56) References Cited

U.S. PATENT DOCUMENTS

| | | | |
|---|---|---|---|
| 4,991,115 A | 2/1991 | Guthrie et al. | |
| 5,396,351 A | 3/1995 | Gessel | |
| 5,450,222 A | 9/1995 | Sirkin | |
| 5,659,378 A | 8/1997 | Gessel | |
| 6,100,953 A * | 8/2000 | Kim et al. | 349/129 |
| 6,157,426 A | 12/2000 | Gu | |
| 6,285,431 B2 | 9/2001 | Lyu | |
| 6,433,933 B1 | 8/2002 | Gettemy | |
| 6,466,285 B1 | 10/2002 | Ichikawa | |
| 6,466,290 B2 | 10/2002 | Kim | |
| 6,536,933 B1 | 3/2003 | Gettemy et al. | |
| 6,545,862 B1 | 4/2003 | Gettemy et al. | |

(Continued)

FOREIGN PATENT DOCUMENTS

| | | |
|---|---|---|
| JP | 10274777 | 10/1998 |
| JP | 10301150 | 11/1998 |

(Continued)

OTHER PUBLICATIONS

U.S. Appl. No. 12/371,284, filed Feb. 13, 2009, Chang et al.

(Continued)

*Primary Examiner* — Joseph Feild
*Assistant Examiner* — Linh Nguyen
(74) *Attorney, Agent, or Firm* — Fletcher Yoder PC

(57) ABSTRACT

Aspects of the present disclosure relate to single-domain electrode configurations that may be implemented in the unit pixels of a LCD device, such as a fringe field switching (FFS) LCD, to provide a "pseudo-multi-domain" effect, wherein the benefits of both conventional single-domain and multi-domain pixel configuration devices are retained. In accordance with aspects of the present technique, single-domain unit pixels are angled or tilted in differing directions with respect to a vertical axis of the LCD panel (e.g., y-axis) to provide an alternating and/or periodic arrangement of different-angled pixel electrodes along each scanning line, data line, or a combination of both scanning and data lines. In this manner, the transmittance rates of conventional single-domain LCD panels may be retained while providing for improved viewing angle and color shift properties typical of conventional multi-domain LCD panels.

33 Claims, 10 Drawing Sheets

(56) References Cited

U.S. PATENT DOCUMENTS

| | | | |
|---|---|---|---|
| 6,600,542 B2 * | 7/2003 | Kim et al. | 349/141 |
| 6,603,469 B1 | 8/2003 | Gettemy et al. | |
| 6,603,526 B2 | 8/2003 | Kim et al. | |
| 6,618,044 B1 | 9/2003 | Gettemy et al. | |
| 6,642,985 B2 | 11/2003 | Kim | |
| 6,685,328 B1 | 2/2004 | Hanson et al. | |
| 6,700,560 B2 | 3/2004 | Sumiya | |
| 6,710,754 B2 | 3/2004 | Hanson et al. | |
| 6,718,115 B1 | 4/2004 | Gettemy et al. | |
| 6,741,314 B2 | 5/2004 | Song | |
| 6,771,344 B2 | 8/2004 | Lyu et al. | |
| 6,859,244 B2 | 2/2005 | Kawase et al. | |
| 6,888,532 B2 | 5/2005 | Wong et al. | |
| 6,919,681 B2 | 7/2005 | Cok | |
| 6,924,752 B2 | 8/2005 | Gettemy et al. | |
| 6,924,863 B2 | 8/2005 | Nishida | |
| 6,947,017 B1 | 9/2005 | Gettemy | |
| 6,965,375 B1 | 11/2005 | Gettemy et al. | |
| 6,992,659 B2 | 1/2006 | Gettemy | |
| 7,002,569 B1 | 2/2006 | Gettemy et al. | |
| 7,006,080 B2 | 2/2006 | Gettemy | |
| 7,034,802 B1 | 4/2006 | Gettemy et al. | |
| 7,048,401 B2 | 5/2006 | Lee et al. | |
| 7,057,579 B2 | 6/2006 | Hanson et al. | |
| 7,057,698 B2 | 6/2006 | Chung | |
| 7,068,256 B1 | 6/2006 | Gettemy et al. | |
| 7,079,119 B2 | 7/2006 | Hanson et al. | |
| 7,091,964 B2 | 8/2006 | Wong et al. | |
| 7,095,387 B2 | 8/2006 | Lee et al. | |
| 7,159,194 B2 | 1/2007 | Wong et al. | |
| 7,167,309 B2 | 1/2007 | Saxena | |
| 7,203,075 B2 | 4/2007 | Terada et al. | |
| 7,248,271 B2 | 7/2007 | Credelle | |
| 7,248,320 B2 | 7/2007 | Hirakata | |
| 7,256,767 B2 | 8/2007 | Wong et al. | |
| 7,259,812 B2 * | 8/2007 | Park et al. | 349/106 |
| 7,268,775 B1 | 9/2007 | Gettemy | |
| 7,304,707 B2 | 12/2007 | Son | |
| 7,324,093 B1 | 1/2008 | Gettemy et al. | |
| 7,339,639 B2 | 3/2008 | Nakano et al. | |
| 7,342,571 B2 | 3/2008 | Fraser et al. | |
| 7,348,964 B1 | 3/2008 | Gettemy et al. | |
| 7,349,052 B2 | 3/2008 | Wu et al. | |
| 7,362,338 B1 | 4/2008 | Gettemy et al. | |
| 7,379,143 B2 | 5/2008 | Lyu | |
| 7,466,373 B2 | 12/2008 | Xu et al. | |
| 7,483,016 B1 | 1/2009 | Gettemy et al. | |
| 7,751,013 B2 | 7/2010 | Oke et al. | |
| 8,068,203 B2 * | 11/2011 | Nomura et al. | 349/141 |
| 2001/0005259 A1 * | 6/2001 | Ogura | 349/172 |
| 2003/0098857 A1 | 5/2003 | Gettemy et al. | |
| 2003/0160755 A1 | 8/2003 | Gettemy et al. | |
| 2004/0046739 A1 | 3/2004 | Gettemy | |
| 2004/0085503 A1 | 5/2004 | Kim | |
| 2004/0263748 A1 | 12/2004 | Park et al. | |
| 2005/0139837 A1 | 6/2005 | Lee | |
| 2005/0184974 A1 | 8/2005 | Gettemy et al. | |
| 2005/0212999 A1 | 9/2005 | Yang | |
| 2005/0269580 A1 | 12/2005 | D'Angelo | |
| 2006/0018175 A1 | 1/2006 | Liljedahl | |
| 2006/0066805 A1 | 3/2006 | Grunnet-Jepsen | |
| 2006/0197740 A1 | 9/2006 | Xu et al. | |
| 2006/0203169 A1 | 9/2006 | Ozawa | |
| 2006/0232553 A1 | 10/2006 | Wong et al. | |
| 2006/0256264 A1 | 11/2006 | Yang | |
| 2006/0268560 A1 | 11/2006 | Wong et al. | |
| 2006/0279557 A1 | 12/2006 | Gettemy | |
| 2006/0284895 A1 | 12/2006 | Marcu et al. | |
| 2007/0024583 A1 | 2/2007 | Gettemy et al. | |
| 2007/0052617 A1 | 3/2007 | Hanson et al. | |
| 2007/0069975 A1 | 3/2007 | Gettemy et al. | |
| 2007/0070272 A1 | 3/2007 | Gettemy et al. | |
| 2007/0070282 A1 | 3/2007 | Shibahara | |
| 2007/0115417 A1 | 5/2007 | Ge et al. | |
| 2007/0139586 A1 | 6/2007 | Gu et al. | |
| 2007/0152963 A1 | 7/2007 | Wong et al. | |
| 2007/0222927 A1 | 9/2007 | Uehara | |
| 2007/0229475 A1 | 10/2007 | Gettemy et al. | |
| 2007/0229749 A1 | 10/2007 | Kaneko | |
| 2007/0273714 A1 | 11/2007 | Hodge et al. | |
| 2007/0290989 A1 | 12/2007 | Gettemy et al. | |
| 2007/0296693 A1 | 12/2007 | Wong et al. | |
| 2008/0007665 A1 | 1/2008 | Lyu et al. | |
| 2008/0032755 A1 | 2/2008 | Fraser et al. | |
| 2008/0036948 A1 | 2/2008 | Zhong et al. | |
| 2008/0062139 A1 | 3/2008 | Hotelling et al. | |
| 2008/0062140 A1 | 3/2008 | Hotelling et al. | |
| 2008/0062147 A1 | 3/2008 | Hotelling et al. | |
| 2008/0062148 A1 | 3/2008 | Hotelling et al. | |
| 2008/0068549 A1 | 3/2008 | Liao | |
| 2008/0074400 A1 | 3/2008 | Gettemy et al. | |
| 2008/0083569 A1 | 4/2008 | Gettemy et al. | |
| 2008/0117184 A1 | 5/2008 | Gettemy | |
| 2008/0121898 A1 | 5/2008 | Yin et al. | |
| 2008/0137018 A1 | 6/2008 | Lin | |
| 2008/0143946 A1 | 6/2008 | Wang | |
| 2008/0164056 A1 | 7/2008 | Gettemy et al. | |
| 2008/0180801 A1 | 7/2008 | Kobayashi | |
| 2008/0186440 A1 | 8/2008 | Lim | |
| 2008/0204431 A1 | 8/2008 | Chung et al. | |
| 2008/0225217 A1 | 9/2008 | Wakabayashi | |
| 2008/0231959 A1 | 9/2008 | Grip | |
| 2008/0238813 A1 | 10/2008 | Gettemy et al. | |
| 2008/0246726 A1 | 10/2008 | Gettemy | |
| 2008/0259254 A1 | 10/2008 | Kikuchi | |
| 2008/0303998 A1 | 12/2008 | Ohta | |
| 2008/0309627 A1 | 12/2008 | Hotelling et al. | |
| 2008/0309633 A1 | 12/2008 | Hotelling et al. | |
| 2009/0009442 A1 | 1/2009 | Galbraith, Jr. et al. | |

FOREIGN PATENT DOCUMENTS

| | | |
|---|---|---|
| JP | 2001092382 | 4/2001 |
| KR | 1019980086371 | 12/1998 |
| KR | 1019990086579 | 12/1999 |
| KR | 1020000003103 | 1/2000 |
| KR | 2004061426 | 7/2004 |
| KR | 1020050003262 | 1/2005 |
| KR | 10-2006-0046650 | 5/2006 |
| WO | WO 2008077261 | 7/2008 |

OTHER PUBLICATIONS

U.S. Appl. No. 12/371,316, filed Feb. 13, 2009, Chang et al.
U.S. Appl. No. 12/371,342, filed Feb. 13, 2009, Chen et al.
U.S. Appl. No. 12/371,360, filed Feb. 13, 2009, Gu et al.
U.S. Appl. No. 12/371,364, filed Feb. 13, 2009, Chen et al.
U.S. Appl. No. 12/371,368, filed Feb. 13, 2009, Chen et al.
U.S. Appl. No. 12/371,380, filed Feb. 13, 2009, Chen et al.
U.S. Appl. No. 12/371,452, filed Feb. 13, 2009, Chang et al.
U.S. Appl. No. 12/415,848, filed Mar. 31, 2009, Chen et al.
U.S. Appl. No. 12/236,066, filed Sep. 23, 2008, Gettemy et al.
Jung, Byunghoo, et al.; "Improved Aperture Ratio Through Asymmetric Pixel Electrode Design"; Feb. 13, 1997.
KIPO's Notice of Last Preliminary Rejection for Korean Application No. 10-2011-7020704 issued Feb. 27, 2013, 16 pages.

* cited by examiner

PSEUDO MULTI-DOMAIN DESIGN FOR IMPROVED VIEWING ANGLE AND COLOR SHIFT

BACKGROUND

1. Technical Field

Embodiments of the present disclosure relate generally to display devices and, more particularly, to liquid crystal display (LCD) devices.

2. Description of the Related Art

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery powered devices or in other contexts were it is desirable to minimize power usage. LCD devices typically include a plurality of unit pixels arranged in a matrix. The unit pixels may be driven by scanning line and data line circuitry to display an image that may be perceived by a user.

Conventional unit pixels of fringe-field switching (FFS) LCD display panels may utilize multi-domain or single-domain configurations and may typically include strip-shaped or finger-shaped pixel electrodes. The pixel electrodes are generally controlled by transistors to create electrical fields that allow at least a portion of a light source to pass through a liquid crystal material within the pixels. In conventional single-domain pixel configurations, pixel electrodes are generally arranged parallel to one another such that all the pixel electrodes within the LCD panel are oriented in the same direction. Generally, this results in the electrical fields generated within a single-domain unit pixel being in the same direction throughout the unit pixel, thereby providing a higher light transmittance rate compared to that of multi-domain pixel configurations. However, conventional single-domain pixel configurations generally offer poorer viewing angles and color shift properties compared to multi-domain configurations.

In conventional multi-domain pixel configurations, pixel electrodes within each unit pixel may be oriented in more than one direction. In this manner, the overall viewing angle and color shift properties of the LCD panel may be improved. However, disclinations may result in light-transmissive portions of multi-domain unit pixels due to the differing directions of electrical fields. Such disinclinations are particularly problematic in that they may block a portion of the light transmitted through the pixels, thus reducing the overall transmittance rate of the LCD panel.

SUMMARY

Certain aspects of embodiments disclosed herein by way of example are summarized below. It should be understood that these aspects are presented merely to provide the reader with a brief summary of certain forms that the various techniques disclosed and/or claimed herein might take and that these aspects are not intended to limit the scope of any technique disclosed and/or claimed herein. Indeed, any technique disclosed and/or claimed herein may encompass a variety of aspects that may not be set forth below.

The present disclosure generally relates to single-domain electrode configurations that may be implemented in the unit pixels of a LCD device, such as a fringe field switching (FFS) LCD, to provide a "pseudo-multi-domain" effect, wherein the benefits of both conventional single-domain and multi-domain pixel configuration devices are retained. In accordance with aspects of the present technique, single-domain unit pixels are provided in order to maintain the relatively higher transmittance rates (as opposed to multi-domain transmittance rates) typical of conventional single-domain LCD panels (as opposed to multi-domain panel transmittance rates). In one embodiment, the single-domain unit pixels may be angled or tilted in differing directions with respect to a vertical axis of the LCD panel (e.g., y-axis) to provide an alternating and/or periodic arrangement of different-angled pixel electrodes along each scanning line, data line, or a combination of both scanning and data lines. In this manner, the transmittance rates of conventional single-domain LCD panels may be retained while providing for improved viewing angle and color shift properties typical of conventional multi-domain LCD panels.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

DESCRIPTION OF THE DRAWINGS

These and other features, aspects, and advantages of the present disclosure will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. These described embodiments are only exemplary of the presently disclosed techniques. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
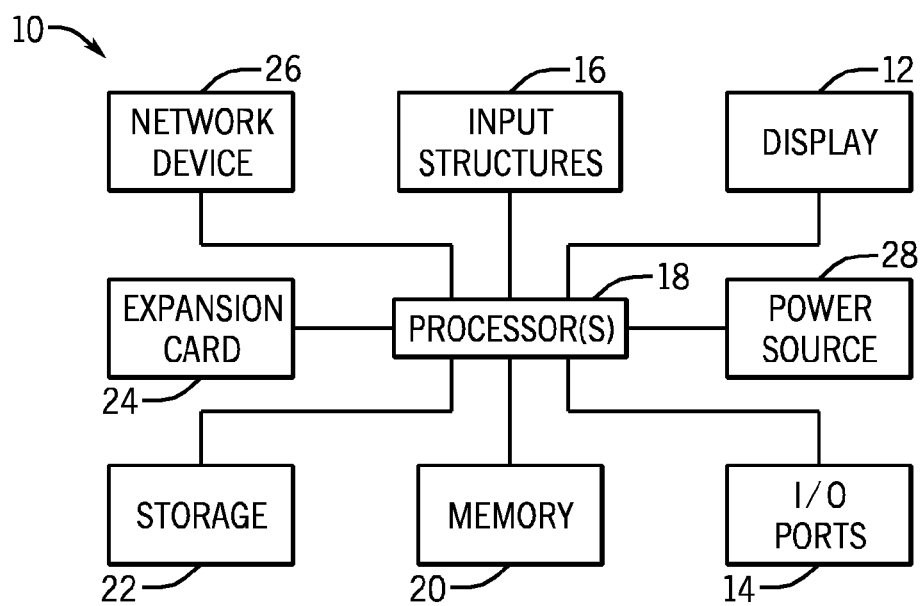
FIG. 1 is a block diagram depicting exemplary components of an electronic device, in accordance with aspects of the present disclosure.
Figure 3:
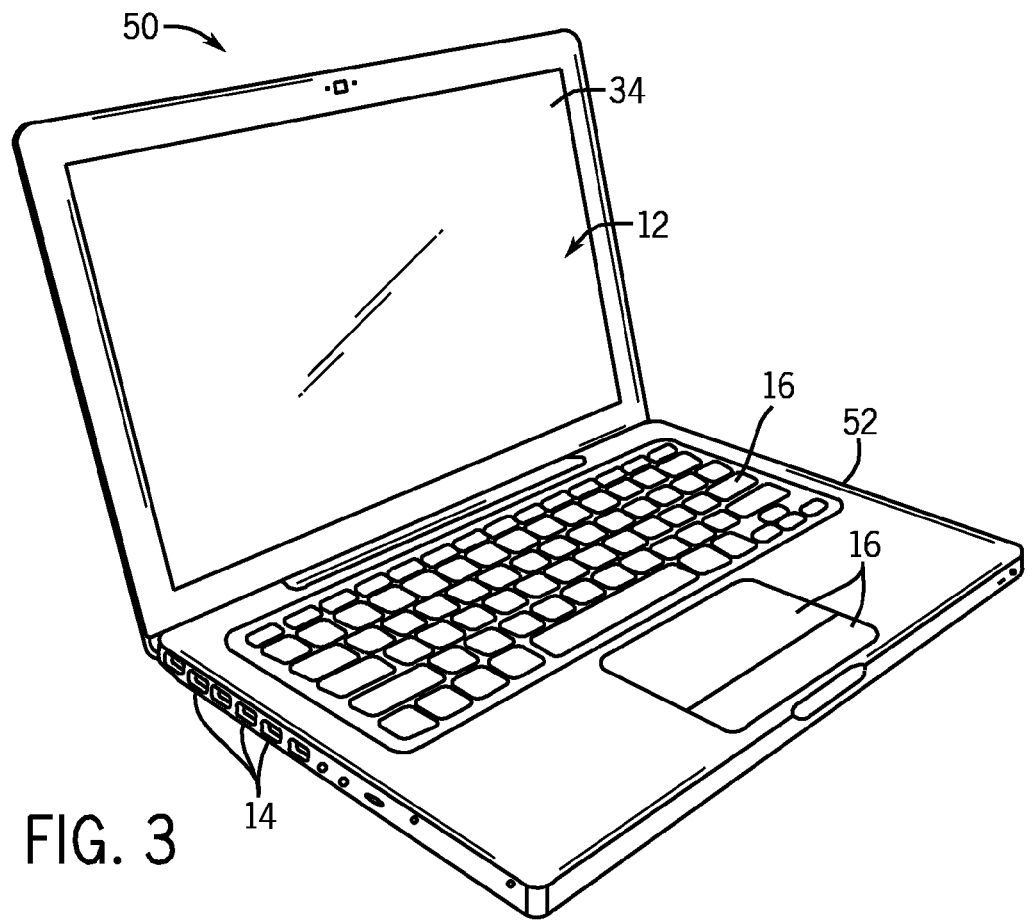
FIG. 3 is a view of a computer, in accordance with aspects of the present disclosure.
Figure 2:
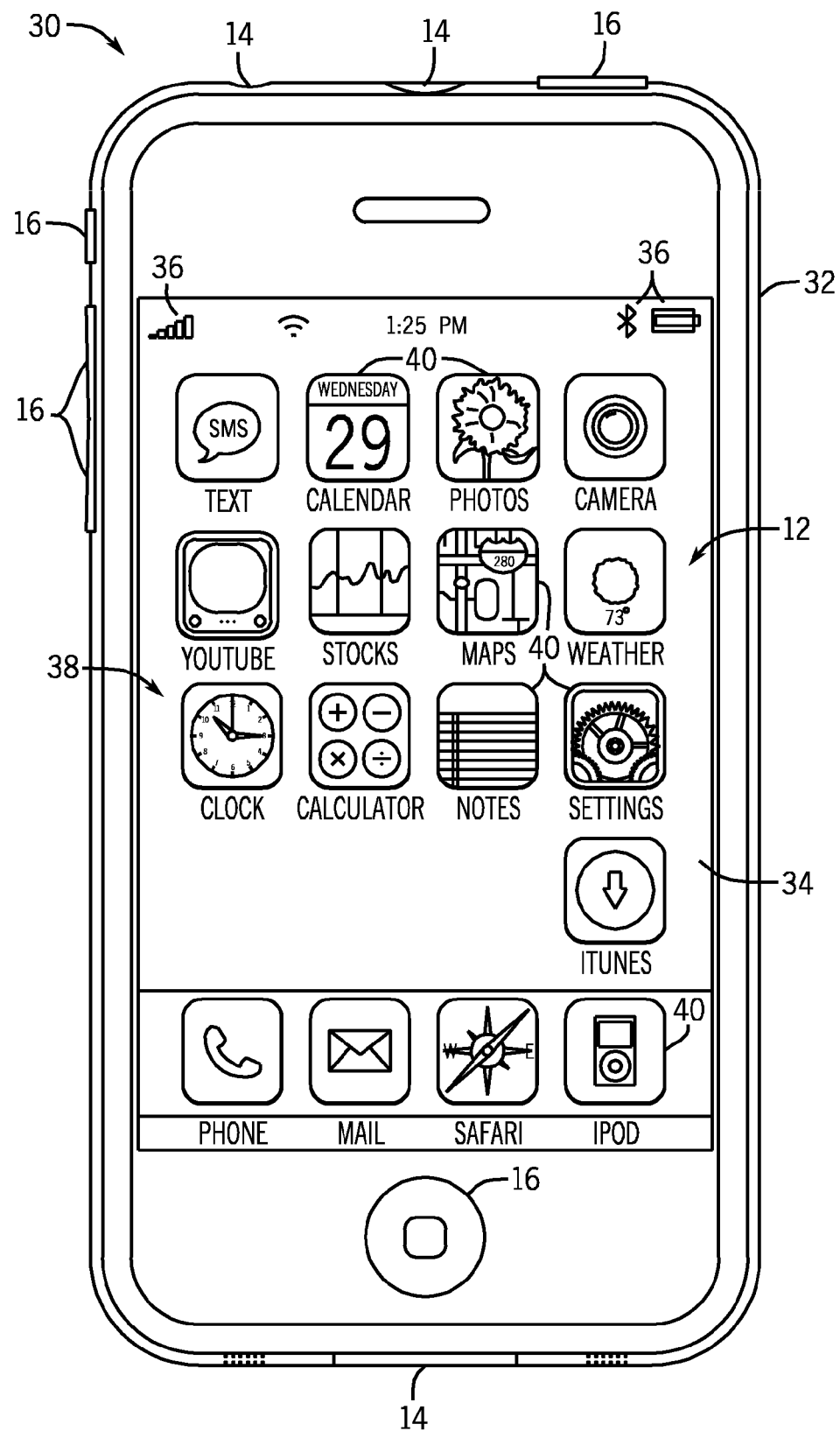
FIG. 2 is a front view of a handheld electronic device, in accordance with aspects of the present disclosure.

With these foregoing features in mind, a general description of suitable electronic devices using LCD displays that may implement pseudo multi-domain properties in accordance with aspects of the present disclosure is provided below. In FIG. 1, a block diagram depicting various components that may be present in electronic devices suitable for use with the present techniques is provided. In FIG. 2, one example of a suitable electronic device, provided here as a handheld electronic device, is depicted. In FIG. 3, another example of a suitable electronic device, provided here as a computer system, is depicted. These types of electronic devices, and other electronic devices providing comparable display capabilities, may be used in conjunction with the present techniques.

An example of a suitable electronic device may include various internal and/or external components which contribute to the function of the device. FIG. 1 is a block diagram illustrating the components that may be present in such an electronic device 10 and which may allow the device 10 to function in accordance with the techniques discussed herein. Those of ordinary skill in the art will appreciate that the various functional blocks shown in FIG. 1 may comprise hardware elements (including circuitry), software elements (including computer code stored on a computer-readable medium) or a combination of both hardware and software elements. It should further be noted that FIG. 1 is merely one example of a particular implementation and is merely intended to illustrate the types of components that may be present in a device 10. For example, in the presently illustrated embodiment, these components may include a display 12, I/O ports 14, input structures 16, one or more processors 18, a memory device 20, a non-volatile storage 22, expansion card(s) 24, a networking device 26, and a power source 28.

With regard to each of these components, the display 12 may be used to display various images generated by the device 10. In one embodiment, the display 12 may be a liquid crystal displays (LCD). For example, the display 12 may be an LCD employing fringe field switching (FFS), in-plane switching (IPS), or other techniques useful in operating such LCD devices. Additionally, in certain embodiments of the electronic device 10, the display 12 may be provided in conjunction with a touch-sensitive element, such as a touch-screen, that may be used as part of the control interface for the device 10.

The I/O ports 14 may include ports configured to connect to a variety of external devices, such as a power source, headset or headphones, or other electronic devices (such as handheld devices and/or computers, printers, projectors, external displays, modems, docking stations, and so forth). The I/O ports 14 may support any interface type, such as a universal serial bus (USB) port, a video port, a serial connection port, an IEEE-1394 port, an Ethernet or modem port, and/or an AC/DC power connection port.

The input structures 16 may include the various devices, circuitry, and pathways by which user input or feedback is provided to the processor 18. Such input structures 16 may be configured to control a function of the device 10, applications running on the device 10, and/or any interfaces or devices connected to or used by the electronic device 10. For example, the input structures 16 may allow a user to navigate a displayed user interface or application interface. Examples of the input structures 16 may include buttons, sliders, switches, control pads, keys, knobs, scroll wheels, keyboards, mice, touchpads, and so forth.

In certain embodiments, an input structure 16 and display 12 may be provided together, such an in the case of a touch-screen where a touch-sensitive mechanism is provided in conjunction with the display 12. In such embodiments, the user may select or interact with displayed interface elements via the touch-sensitive mechanism. In this way, the displayed interface may provide interactive functionality, allowing a user to navigate the displayed interface by touching the display 12. For example, user interaction with the input structures 16, such as to interact with a user or application interface displayed on the display 12, may generate electrical signals indicative of the user input. These input signals may be routed via suitable pathways, such as an input hub or data bus, to the one or more processor 18 for further processing.

In addition to processing various input signals received via the input structure(s) 16, the processor(s) 18 may control the general operation of the device 10. For instance, the processor(s) 18 may provide the processing capability to execute an operating system, programs, user and application interfaces, and any other functions of the electronic device 10. The processor(s) 18 may include one or more microprocessors, such as one or more "general-purpose" microprocessors, one or more special-purpose microprocessors and/or application-specific microprocessors (ASICs), or some combination of such processing components. For example, the processor 18 may include one or more instruction set (RISC) processors, as well as graphics processors, video processors, audio processors and/or related chip sets. As will be appreciated, the processor(s) 18 may be coupled to one or more data buses for transferring data and instructions between various components of the device 10.

The instructions or data to be processed by the processor(s) 18 may be stored in a computer-readable medium, such as a memory 20. Such a memory 20 may be provided as a volatile memory, such as random access memory (RAM) or as a non-volatile memory, such as read-only memory (ROM), or as a combination of one or more RAM and ROM devices. The memory 20 may store a variety of information and may be used for various purposes. For example, the memory 20 may store firmware for the electronic device 10, such as a basic input/output system (BIOS), an operating system, various programs, applications, or any other routines that may be executed on the electronic device 10, including user interface functions, processor functions, and so forth. In addition, the memory 20 may be used for buffering or caching during operation of the electronic device 10.

In addition to the memory 20, the device 10 may further include a non-volatile storage 22 for persistent storage of data and/or instructions. The non-volatile storage 22 may include flash memory, a hard drive, or any other optical, magnetic, and/or solid-state storage media, or some combination thereof. The non-volatile storage 22 may be used to store data files such as firmware, data files, software programs and applications, wireless connection information, personal information, user preferences, and any other suitable data.

The embodiment illustrated in FIG. 1 may also include one or more card or expansion slots. The card slots may be configured to receive an expansion card 24 that may be used to add functionality, such as additional memory, I/O functionality, or networking capability, to the electronic device 10. Such an expansion card 24 may connect to the device through any type of suitable connector, and may be accessed internally or external with respect to a housing of the electronic device 10. For example, in one embodiment, the expansion card 24 may be flash memory card, such as a SecureDigital (SD) card, mini- or microSD, CompactFlash card, Multimedia card (MMC), or the like. Additionally, the expansion card 24 may be a Subscriber Identity Module (SIM) card, for use with an embodiment of the electronic device 10 that provides mobile phone capability.

The components depicted in FIG. 1 also include a network device 26, such as a network controller or a network interface card (NIC). In one embodiment, the network device 26 may be a wireless NIC providing wireless connectivity over any 802.11 standard or any other suitable wireless networking standard. The network device 26 may allow the electronic device 10 to communicate over a network, such as a Local Area Network (LAN), Wide Area Network (WAN), such as an Enhanced Data Rates for GSM Evolution (EDGE) network for a 3G data network (e.g., based on the IMT-2000 standard), or the Internet. Additionally, the network device 26 may provide for connectivity to a personal area network, such as a Bluetooth® network, an IEEE 802.15.4 (e.g., ZigBee) network, or an ultra wideband network (UWB). In some embodiments, the network device 26 may further provide for close-range communications using a near-field communication (NFC) interface operating in accordance with one or more standards, such as ISO 18092, ISO 21481, or the TransferJet® protocol.

As will be understood, the device 10 may use the network device 26 to connect to and send or receive data with any device on a common network, such as portable electronic devices, personal computers, printers, and so forth. Alternatively, in some embodiments, the electronic device 10 may not include a network device 26. In such an embodiment, a NIC may be added as an expansion card 24 to provide similar networking capability as described above.

Further, the components may also include a power source 28. In one embodiment, the power source 28 may be provided as one or more batteries, such as a lithium-ion polymer battery. The battery may be user-removable or may be secured within the housing of the electronic device 10, and may be rechargeable. Additionally, the power source 28 may include AC power, such as provided by an electrical outlet, and the electronic device 10 may be connected to the power source 28 via a power adapter, which may also be used to recharge one or more batteries if present.

With the foregoing in mind, FIG. 2 illustrates an electronic device 10 in the form of a portable handheld device 30, provided here as a cellular telephone. It should be understood that while the illustrated device 30 is generally described in the context of a cellular phone, other types of handheld devices may be provided as the handheld device 30, such as a digital media player for playing music and/or video, a personal data organizer, a gaming platform, to name just a few. Further, various embodiments of the handheld device 30 may incorporate the functionalities of one or more types of devices, such as a cellular phone function, a digital media player, a camera, a portable gaming platform, a personal data organizer, or some combination thereof. Thus, depending on the functionalities provided by the handheld electronic device 30, a user may listen to music, play video games, take pictures, and place telephone calls, while moving freely with the device 30.

As discussed above with respect to the electronic device 10 shown in FIG. 1, the handheld device 30 may allow a user to connect to and communicate (e.g., using the network device 26) through the Internet or through other networks, such as local or wide area networks. For example, the handheld device 30 may allow a user to communicate using e-mail, text messaging, instant messaging, or other forms of electronic communication. In certain embodiments, the handheld device 30 also may communicate with other devices using short-range connection protocols, such as Bluetooth and near field communication (NFC). By way of example only, the handheld device 30 may be a model of an iPod® or an iPhone®, available from Apple Inc. of Cupertino, Calif.

In the depicted embodiment, the handheld device 30 includes an enclosure 32, which may function to protect the interior components from physical damage and shield them from electromagnetic interference. The enclosure 32 may be formed from any suitable material or combination of materials, such as plastic, metal, or a composite material, and may allow certain frequencies of electromagnetic radiation to pass through to wireless communication circuitry within the handheld device 30 to facilitate wireless communication.

As shown in the present embodiment, the enclosure 32 includes the user input structures 16 through which a user may interface with the device 30. For instance, each input structure 16 may be configured to control one or more respective device functions when pressed or actuated. By way of example, in a cellular phone implementation, one or more of the input structures 16 may be configured to invoke a "home" screen or menu to be displayed, to toggle between a sleep, wake, or powered on/off mode, to silence a ringer for a cellular phone application, to increase or decrease a volume output, and so forth. It should be understood that the illustrated input structures 16 are merely exemplary, and that the handheld electronic device 30 may include any number of suitable user input structures existing in various forms including buttons, switches, control pads, keys, knobs, scroll wheels, and so forth, depending on specific implementation goals and/or requirements.

In the illustrated embodiment, the handheld device 30 includes the above-discussed display 12 in the form of a liquid crystal display (LCD) 34. The LCD 34 may display various images generated by the handheld device 30. For example, the LCD 34 may display various system indicators 36 that provide feedback to a user with regard to one or more states of the handheld device 30, such as power status, signal strength, call status, external device connections, and so forth.

The LCD 34 may also be configured to display a graphical user interface ("GUI") 38 that allows a user to interact with the handheld device 30. The GUI 38 may include various layers, windows, screens, templates, or other graphical elements that may be displayed in all, or a portion, of the LCD 34. Generally, the GUI 38 may include graphical elements that represent applications and functions of the electronic device. The graphical elements may include icons 40 and other images representing buttons, sliders, menu bars, and the like. The icons 40 may correspond to various applications of the electronic device that may open or execute upon detecting a user selection of a respective icon 40. In some embodiments, the selection of an icon 40 may lead to a hierarchical navigation process, such that selection of an icon 40 leads to a screen that includes one or more additional icons or other GUI elements. As will be appreciated, the icons 40 may be selected via a touchscreen included in the display 12, or may be selected by a user input structure 16, such as a wheel or button.

The handheld electronic device 30 additionally includes various input and output (I/O) ports 14 that allow connection of the handheld device 30 to one or more external devices. For example, one I/O port 14 may be a port that allows the transmission and reception of data or commands between the handheld electronic device 30 and another electronic device, such as a computer system. In some embodiments, certain I/O ports 14 may be have dual functions depending, for example, on the external component being coupled to the handheld device 30 via the I/O port 14. For instance, in addition to providing for the transmission of reception of data when connected to another electronic device, certain I/O ports 14 may also charge a battery (power source 28) of the handheld device 30 when coupled to a power adaptor configured to draw/provide power from an external power source, such as an electrical wall outlet. Such an I/O port 14 may be a proprietary port from Apple Inc. or may be an open standard I/O port, such as a universal serial bus (USB) port.

In addition to handheld devices 30, such as the depicted cellular telephone of FIG. 2, an electronic device 10, in accordance with embodiments of the present invention, may also take the form of a computer or other type of electronic device. For instance, such computers may include computers that are generally portable (such as laptop, notebook, and tablet computers) as well as computers that are generally non-portable (such as conventional desktop computers, workstations and/or servers). In certain embodiments, the electronic device 10 in the form of a computer may be a model of a MacBook®, MacBook® Pro, MacBook Air®, iMac®, Mac® mini, or PowerBook® available from Apple Inc. By way of example, an electronic device 10 in the form of a laptop computer 50 is illustrated in FIG. 3 in accordance with one embodiment of the present invention. The depicted computer 50 includes a housing 52, the display 12 (such as the depicted LCD 34 of FIG. 2), the input structures 16, and the I/O ports 14.

In one embodiment, the input structures 16 may include a keyboard, a touchpad, as well as various other buttons and/or switches which may be used to interact with the computer 50, such as to power on or start the computer, to operate a GUI or an application running on the computer 50, as well as adjust various other aspects relating to operation of the computer 50 (e.g., sound volume, display brightness, etc.). For example, a keyboard and/or a touchpad may allow a user to navigate a user interface (e.g., GUI) or an application interface displayed on the LCD 34.

As shown in the present figure, the electronic device 10 in the form of the computer 50 may also include various I/O ports 14 that provide for connectivity to additional devices. For instance, the computer 50 may include an I/O port 14, such as a USB port, a FireWire® (IEEE 1394) port, a high definition multimedia interface (HDMI) port, or any other type of port that is suitable for connecting to an external device, such as another computer or handheld device, a projector, a supplemental display, an external storage device, or so forth. Additionally, the computer 50 may include network connectivity (e.g., network device 26), memory (e.g., memory 20), and storage capabilities (e.g., storage device 22), as described above with respect to FIG. 1. Thus, the computer 50 may store and execute a GUI and various other applications.

With the foregoing discussion in mind, it may be appreciated that an electronic device 10 in either the form of a handheld device 30 (FIG. 2) or a computer 50 (FIG. 3) may be provided with a display device 10 in the form of an LCD 34. As discussed above, an LCD 34 may be utilized for displayed respective operating system and/or application graphical user interfaces running on the electronic device 10 and/or for displaying various data files, including textual, image, video data, or any other type of visual output data that may be associated with the operation of the electronic device 10.

In embodiments in which the electronic device 10 includes an LCD 34, the LCD 34 may typically include an array or matrix of picture elements (i.e., pixels). In operation, the LCD 34 generally operates to modulate the transmittance of light through each pixel by controlling the orientation of liquid crystal disposed at each pixel such that the amount of emitted or reflected light emitted by each pixel is controlled. In general, the orientation of the liquid crystals is controlled by a varying electric field associated with each respective pixel, with the liquid crystals being oriented at any given instant by the properties (e.g., strength, shape, and so forth) of the applied electric field.

As can be appreciated, different types of LCDs may employ different techniques for manipulating these electrical fields and/or the liquid crystals. For example, certain LCDs may employ transverse electric field modes in which the liquid crystals are oriented by applying an in-plane electrical field to a layer of the liquid crystals. Example of such techniques include in-plane switching (IPS) and fringe field switching (FFS) techniques, which differ in the type of electrode arrangement employed to generate the respective electrical fields.

While control of the orientation of the liquid crystals in such displays may be sufficient to modulate the amount of light emitted by a pixel, color filters may also be associated with each pixel within the LCD 34 to allow specific colors of light to be emitted by each pixel. For example, in embodiments where the LCD 34 is a color display, each pixel of a group of pixels may correspond to a different primary color. For example, in one embodiment, a group of pixels may include a red pixel, a green pixel, and a blue pixel, each associated with an appropriately colored filter element. The intensity of light allowed to pass through each pixel (e.g., by modulation of the corresponding liquid crystals), and its combination with the light emitted from other adjacent pixels, determines what color or colors are perceived by a user viewing the display. As the viewable colors are formed from individual color components (e.g., red, green, and blue) provided by the one or a combination of colored pixels, each of the colored pixels themselves may also be referred to herein as "pixels" or "unit pixels" or the like.

Figure 4:
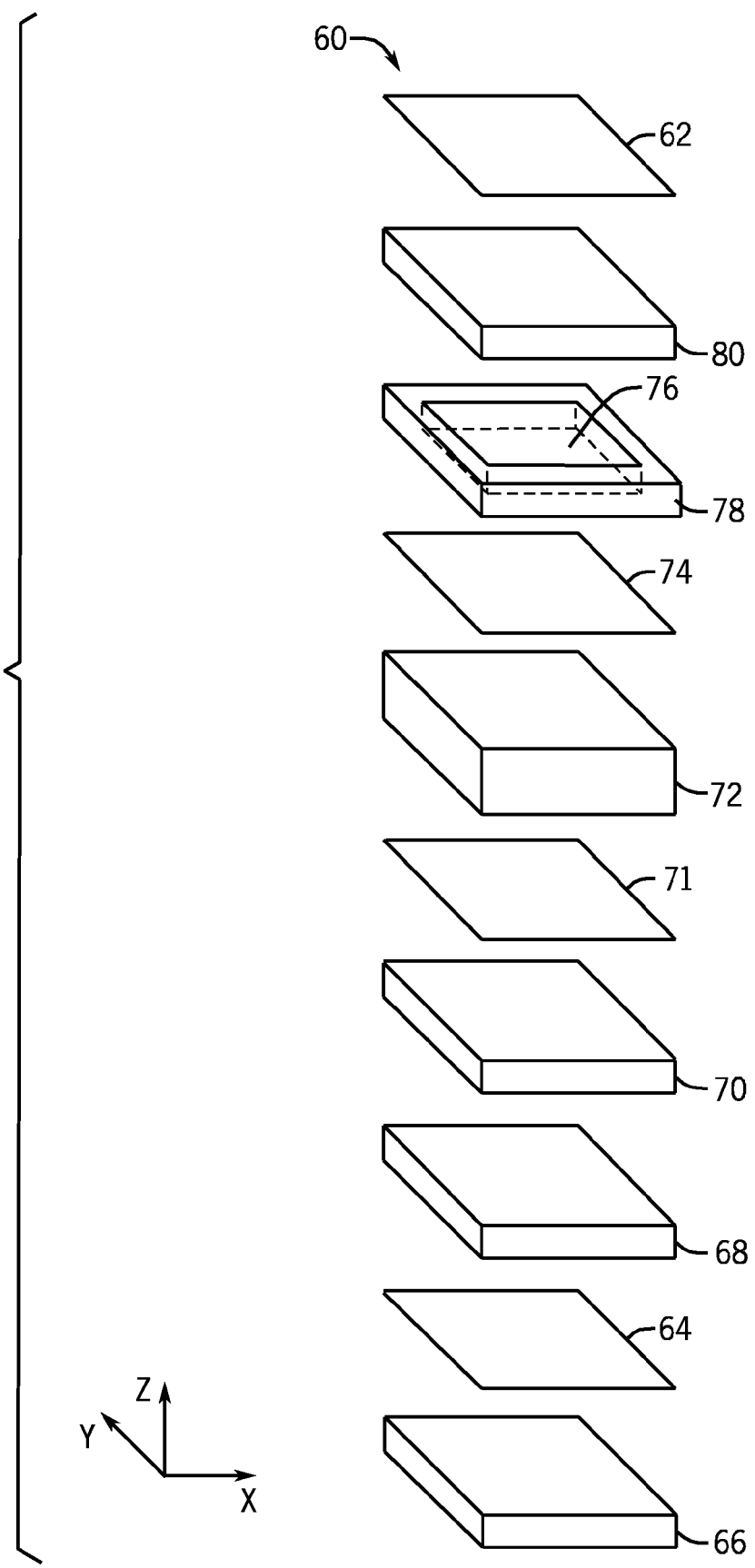
FIG. 4 is an exploded view of exemplary layers of a unit pixel of an LCD display panel, in accordance with aspects of the present disclosure.

With the foregoing in mind, and referring once again to the figures, FIG. 4 depicts an exploded view showing different layers that may be implemented in a unit pixel of an LCD 34. The pixel, referred to herein by the reference number 60, includes an upper polarizing layer 62 and a lower polarizing layer 64 that polarize light emitted by a light source 66, which may be provided as a backlight assembly unit or a light-reflective surface. In embodiments where the light source 66 is a backlight assembly unit, any type of suitable lighting device, such as cold cathode fluorescent lamps (CCFLs), hot cathode fluorescent lamps (HCFLs), and/or light emitting diodes (LEDs), may be utilize to provide lighting.

As shown in the present embodiment, a lower substrate 68 is disposed above the lower polarizing layer 64. The lower substrate 68 is generally formed from a light-transparent material, such as glass, quartz, and/or plastic. A thin film transistor (TFT) layer 70 is depicted as being disposed above the lower substrate 68. For simplicity of illustration, the TFT layer 70 is depicted as a generalized structure in FIG. 4. In practice, the TFT layer 70 may itself include various conductive, non-conductive, and semiconductive layers and structures which generally form the electrical devices and pathways which drive operation of the unit pixel 60. For example, in an embodiment in which the pixel 60 is part of an FFS LCD panel, the TFT layer 70 may include the respective data lines (also referred to as "source lines"), scanning lines (also referred to as "gate lines"), pixel electrodes, and common electrodes (as well as other conductive traces and structures) of the pixel 60. Such conductive structures may, in light-transmissive portions of the pixel 60, be formed using transparent conductive materials, such as indium tin oxide (ITO) or indium zinc oxide (IZO), for example. The TFT layer 70 may further include insulating layers (such as a gate insulating film) formed from suitable transparent materials (such as silicon oxide) and semiconductive layers formed from suitable semiconductor materials (such as amorphous silicon). In general, the respective conductive structures and traces, insulating structures, and semiconductor structures may be suitably disposed to form the respective pixel electrodes and common electrodes, a TFT, and the respective data and scanning lines used to operate the unit pixel 60, as described in further detail below with regard to FIG. 5. In the depicted embodiment, a lower alignment layer 71, which may be formed from polyimide or other suitable materials, may be disposed between the TFT layer 70 and a liquid crystal layer 72.

The liquid crystal layer 72 may include liquid crystal molecules suspended in a fluid or embedded in polymer networks. The liquid crystal molecules may be oriented or aligned with respect to an electrical field generated by the TFT layer 70. In practice, the orientation of the liquid crystal molecules in the liquid crystal layer 72 determines the amount of light (e.g., provided by the light source 66) that is transmitted through the pixel 60. Thus, by modulation of the electrical field applied to the liquid crystal layer 72, the amount of light transmitted though the pixel 60 may be correspondingly modulated.

Disposed on the side of the liquid crystal layer 72 opposite from the TFT layer 70 may be one or more alignment and/or overcoating layers 74 interfacing between the liquid crystal layer 72 and an overlying color filter 76. The color filter 76, in certain embodiments, may be a red, green, or blue filter, such that each unit pixel 60 of the LCD 34 corresponds to a primary color when light is transmitted from the light source 66 through the liquid crystal layer 72 and the color filter 76.

The color filter 76 may be surrounded by a light-opaque mask or matrix 78, commonly referred to as a "black mask," which circumscribes the light-transmissive portion of the unit pixel 60. For example, in certain embodiments, the black mask 78 may be sized and shaped to define a light-transmissive aperture over the liquid crystal layer 72 and around the color filter 76 and to cover or mask portions of the unit pixel 60 that do not transmit light, such as the scanning line and data line driving circuitry, the TFT, and the periphery of the pixel 60. Further, in addition to defining the light-transmissive aperture, the black mask 78 may serve to prevent light transmitted through the aperture and color filter 76 from diffusing or "bleeding" into adjacent unit pixels.

In the depicted embodiment, an upper substrate 80 may be further disposed between the color filter 76 (including the black mask 78) and the upper polarizing layer 64. In such an embodiment, the upper substrate may be formed from light-transmissive glass, quartz, and/or plastic.

Figure 5:
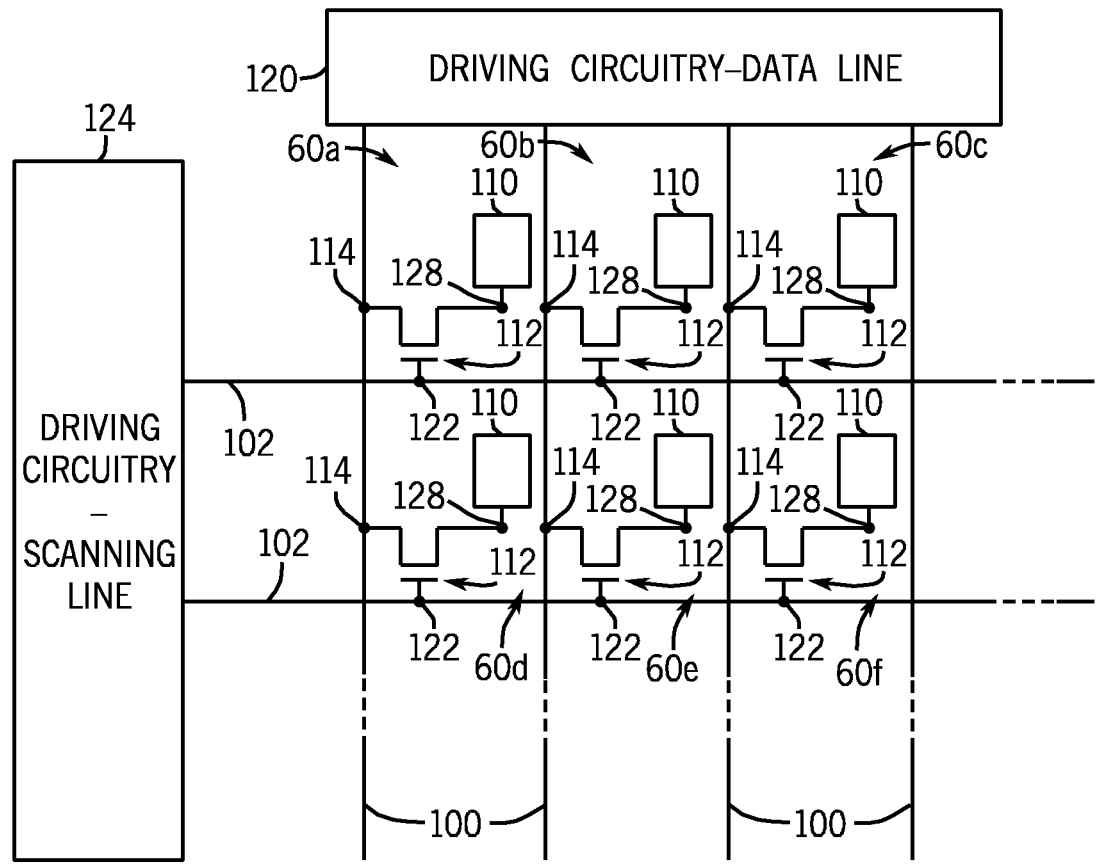
FIG. 5 is a circuit diagram showing switching and display circuitry that may be used in conjunction with an LCD display panel, in accordance with aspects of the present disclosure.

Continuing now to FIG. 5, a schematic circuit representation of pixel driving circuitry found in an LCD 34 is shown. For example, such circuitry as depicted in FIG. 5 may be embodied in the TFT layer 70 described above with respect to FIG. 4. As depicted, a plurality of unit pixels 60, each of which may be formed in accordance with the unit pixel 60 shown in FIG. 4, may be disposed in a pixel array or matrix defining a plurality of rows and columns of unit pixels that collectively form an image display region of an LCD 34. In such an array, each unit pixel 60 may be defined by the intersection of rows and columns, which may be defined by the illustrated data (or "source") lines 100 and scanning (or "gate") lines 102, respectively.

Although only six unit pixels, referred to individually by the reference numbers 60a-60f, respectively, are shown in the present example for purposes of simplicity, it should be understood that in an actual LCD implementation, each data line 100 and scanning line 102 may include hundreds or even thousands of unit pixels. By way of example, in a color LCD panel 34 having a display resolution of 1024×768, each data line 100, which may define a column of the pixel array, may include 768 unit pixels, while each scanning line 102, which may define a row of the pixel array, may include 1024 groups of pixels, wherein each group has a red, blue, and green pixel, thus totaling 3072 unit pixels per scanning line 102. In the present illustration, the group of unit pixels 60a-60c may represent a group of pixels having a red pixel (60a), a blue pixel (60b), and a green pixel (60c). The group of unit pixels 60d-60f may be arranged in a similar manner.

As shown in the present figure, each unit pixel 60 includes a pixel electrode 110 and thin film transistor (TFT) 112 for switching the pixel electrode 110. In the depicted embodiment, the source 114 of each TFT 112 is electrically connected to a data line 100, extending from respective data line driving circuitry 120. Similarly, in the depicted embodiment, the gate 122 of each TFT 112 is electrically connected to a scanning or gate line 102, extending from respective scanning line driving circuitry 124. In the depicted embodiment, the pixel electrode 110 is electrically connected to a drain 128 of the respective TFT 112.

In one embodiment, the data line driving circuitry 120 may send image signals to the pixels 60 by way of the respective data lines 100. Such image signals may be applied by line-sequence. That is, the data lines 100 (defining columns) may be sequentially activated during operation of the LCD 34. The scanning lines 102 (defining rows) may apply scanning signals from the scanning line driving circuitry 124 to the respective gates 122 of each TFT 112 to which the respective scanning lines 102 are connected. Such scanning signals may be applied by line-sequence with a predetermined timing and/or in a pulsed manner.

Each TFT 112 serves as a switching element which may be activated and deactivated (e.g., turned on and off) for a predetermined period based upon the respective presence or absence of a scanning signal at the gate 122 of the TFT 112. When activated, a TFT 112 may store the image signals received via a respective data line 100 as a charge in the pixel electrode 110 with a predetermined timing. The image signals stored by the pixel electrode 110 may be used to generate an electrical field between the respective pixel electrode 110 and a common electrode (not shown in FIG. 5). Such an electrical field may align liquid crystals molecules within the liquid crystal layer 72 (FIG. 4) to modulate light transmission through the liquid crystal layer 72. In some embodiments, a storage capacitor (not shown) may also be provided in parallel to the liquid crystal capacitor formed between the pixel electrode 110 and the common electrode to prevent leakage of the stored image signal by the pixel electrode 110. For example, such a storage capacitor may be provided between the drain 128 of the respective TFT 112 and a separate capacitor line.

Figure 6:
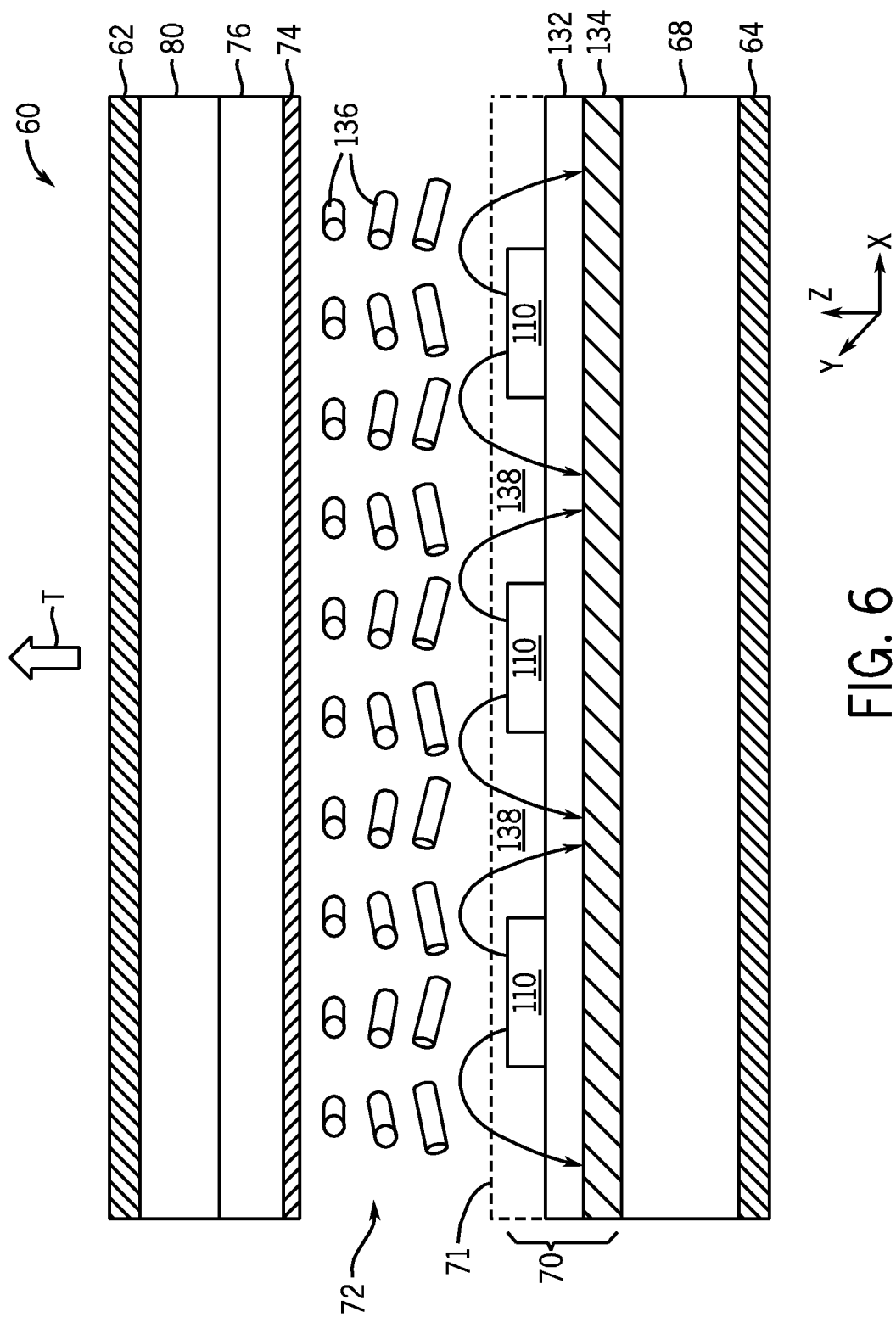
FIG. 6 is a cutaway cross-sectional side view of a unit pixel of an LCD display panel, in accordance with aspects of the present disclosure.
Figure 7:
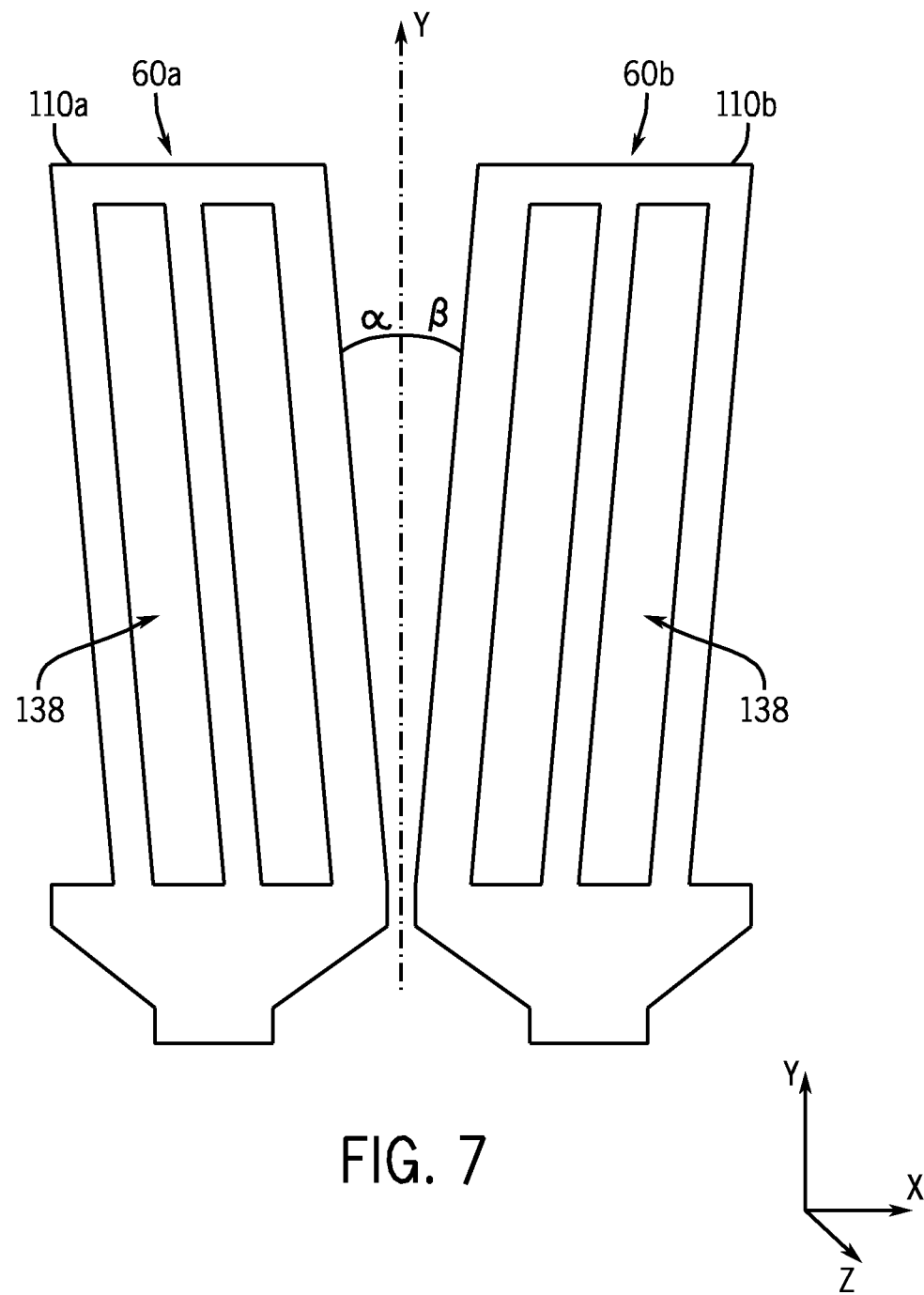
FIG. 7 is a simplified plan view of an electrode arrangement corresponding to two adjacent unit pixels, in accordance with aspects of the present disclosure.

The operation of the unit pixel 60 and, particularly, the arrangement of the pixel electrodes 110 and the common electrodes discussed in FIG. 5 may be better understood with respect to FIG. 6, which illustrates the operation of the unit pixel 60 via a cutaway cross-sectional side view. As shown, the view of the unit pixel 60 in FIG. 6 includes the layers generally described above with reference to FIG. 4, including the upper polarizing layer 62, lower polarizing layer 64, lower substrate 68, TFT layer 70, liquid crystal layer 72, alignment layers 71 and 74, color filter 76, and upper substrate 80.

As mentioned above, the TFT layer 70, which was depicted as a generalized structure in FIG. 4, may include various conductive, non-conductive, and/or semiconductive layers and structures defining electrical devices and pathways for driving the operation of the pixel 60. In the illustrated embodiment, the TFT layer 70 is shown in the context of a fringe field switching (FFS) LCD display device and includes the pixel electrode 110, an insulating layer 132, and a common electrode layer 134. The common electrode layer 134 is disposed above the lower substrate 68, and the insulation layer 132 is disposed between the pixel electrode 110 and the common electrode 134.

The pixel electrodes 110 and the common electrode layer 134 may be made of a transparent conductive material, such as ITO or IZO, as mentioned above. The common electrode layer 134 generally covers the surface of each unit pixel 60, and may be connected to a common line (not shown), which may be parallel to a scanning line 102 to which the illustrated unit pixel 60 is connected. The pixel electrodes 110 may be formed in a single-domain configuration as having a plurality of slit-like voids 138, such that the portions of the pixel electrode 110 between each of the slits 138 define substantially straight (single-domain) "strip-like" or "finger-like" electrode shapes that generally lie within a plane of the unit pixel 60 defined by the x-axis and y-axis (x-y plane), as depicted by the reference axes shown in FIG. 6. As shown in the present figure, portions of the lower alignment layer 71 may at least partially protrude into the region defined by the slits 138. In accordance with aspects of the present disclosure, which will be discussed in further detail below with regard to FIGS. 7-11, the pixel electrode 110 may be arranged such that its electrode "strips" are tilted at an angle (with respect to the y-axis) within the x-y plane.

In accordance with FFS LCD operating principles, the liquid crystal molecules 136 within the liquid crystal layer 72 may have a "default" orientation in a first direction based upon the configuration of the lower 71 and upper alignment layers 74. When a voltage is applied to the unit pixel 60, an electrical field is formed between the pixel electrodes 110 and common electrode layer 134. As discussed above, the electrical field (referred to herein by the reference label E) controls the orientation of liquid crystal molecules 136 within the liquid crystal layer 72, such that the orientation changes with respect to the default orientation, thereby allowing at least a portion of the light transmitted from the light source 66 (not shown in FIG. 6) to be transmitted through the pixel 60. Thus, by modulating the electrical field E, the light provided by the light source 66 and transmitted through the unit pixel 60, as indicated by the reference label T, may be controlled. In this manner, image data sent along the data lines 100 and scanning lines 102 may be perceived by a user viewing the LCD 34 as an image.

Before continuing, it should be understood that the electrodes 110 and electrode layer 134 of the depicted FFS LCD panel may also be implemented in an opposite manner depending on how the FFS LCD panel 34 is constructed. That is, in certain embodiments, electrodes 110 may function as common electrodes and the electrode layer 134 may function as a pixel electrode. Thus, while the following discussion with respect to FIGS. 7-11 will describe various aspects of the present technique as being implemented with respect to the pixel electrodes of unit pixels, it should be appreciated that the presently described techniques may also be applied where the electrodes 110 function as common electrodes.

As discussed above, certain embodiments of the present disclosure provide for unit pixels 60 having pixel electrodes 110 that are angled with respect to a y-axis of the LCD 34. For instance, referring to FIG. 7, a simplified plan view of pixel electrodes 110a and 110b corresponding to two adjacent pixels 60a and 60b (as shown above in FIG. 5) is illustrated. As shown, each of the pixel electrodes 110a and 110b have a single-domain design and are tilted in opposite directions via the angles α and β, respectively, with respect to the y-axis of the LCD 34. That is, each of the electrode strips (between the slits 138) of the pixel electrode 110a are tilted by the angle α with respect to the y-axis, and each of the electrode strips of the pixel electrode 110b are titled by the angle β with respect to the y-axis.

In the depicted embodiment, the magnitude of the angles α and β are shown as being equal with respect to the y-axis. However, in other embodiments, the angles α and β may have different magnitudes. Further, in one embodiment, the values for the angles α and β with respect to the y-axis may be selected such that $0°≦|α|$ and $|β|≦90°$. In another embodiment, the angles α and β may be selected such that $0°≦|α|$ and $|β|≦15°$. In yet a further embodiment, the angles α and β may be selected such that $75°≦|α|$ and $|β|≦90°$. Preferably, the angles α and β may each have magnitudes selected from a range of at least 15° to 75°. As will be discussed below, an LCD 34 implementing aspects of the present technique may provide for various configurations in which a first set of unit pixels 60 having pixel electrodes 110a (tilted at the angle α) and a second set of unit pixels 60 having pixel electrodes 110b (tilted at the angle β) are arranged in an alternating manner either along a scanning line 102, along a data line 100, or a combination thereof.

Figure 8:
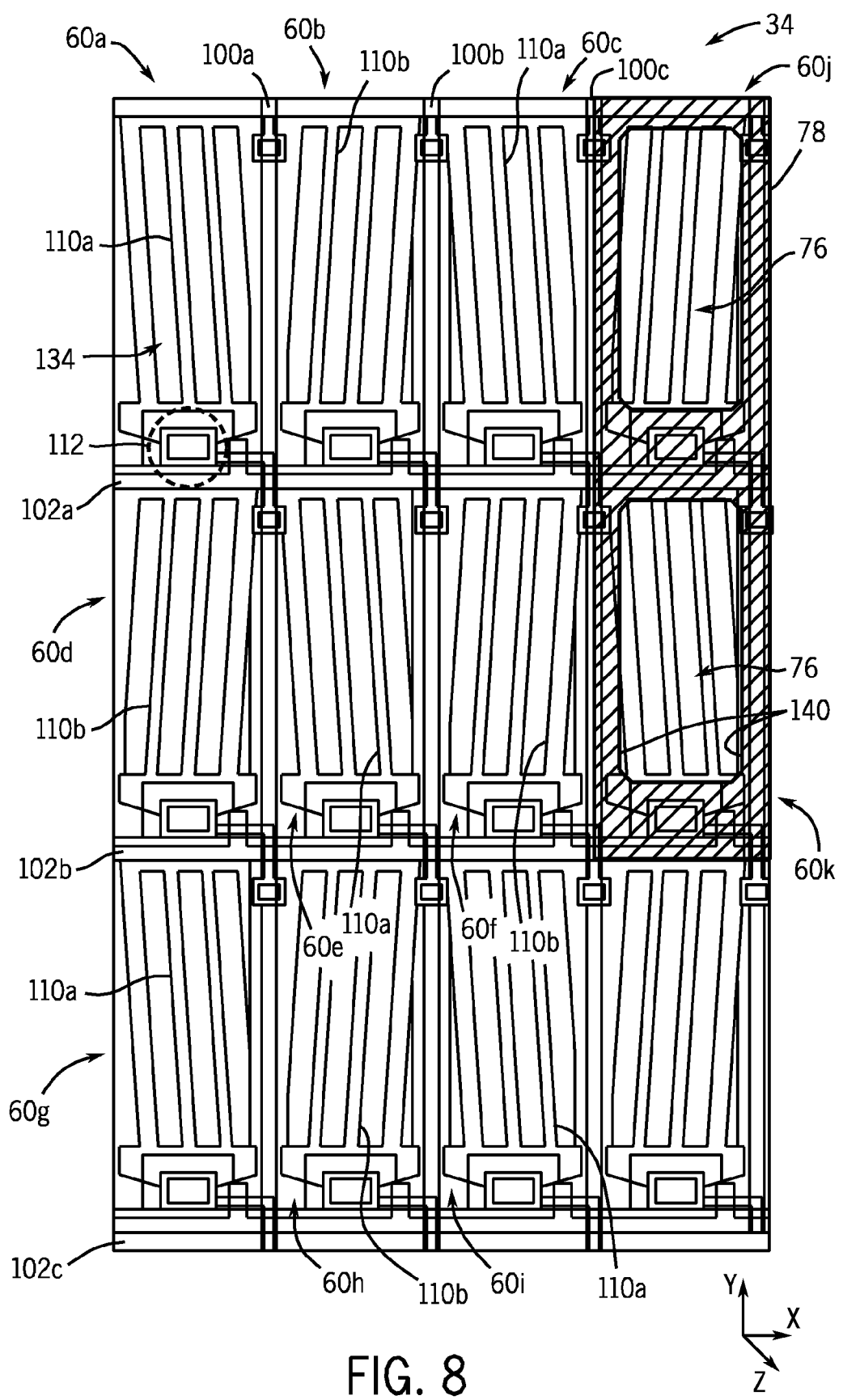
FIG. 8 is a detailed plan view of a portion of an LCD display panel, in accordance with a first embodiment of the present disclosure.

With the foregoing in mind, FIG. 8 depicts a more detailed plan view of a portion of an LCD 34 in accordance with a first embodiment of the present disclosure. Particularly, the portion of the LCD 34 illustrated in FIG. 8 includes the unit pixels 60a-60f discussed above with reference to FIG. 5, as well as the unit pixels 60g-60k. In the depicted embodiment, three scanning lines 102a, 102b, and 102c, and three data lines 100a, 100b, and 100c are shown. The unit pixels 60a-60c are each coupled to the scanning line 102a and respective data lines 100a-100c. Similarly, the unit pixels 60d-60f are each coupled to the scanning line 102b and respective data lines 100a-100c, and the unit pixels 60g-60i are each coupled to the scanning line 102c and respective data lines 100a-100c. As discussed above, where the LCD 34 is a color display, each group of unit pixels 60a-60c, 60d-60f, and 60g-60i, may represent a group of unit pixels having a red, blue, and green unit pixel.

As mentioned above, each unit pixel 60 is generally defined by the intersection of a data line 100 and a scanning line 102. Particularly, the intersection of a data line 100 and a scanning line 102 defines a TFT 112 which serves to apply a voltage (switching on) from the data line 100 to liquid crystal molecules 136 within a corresponding unit pixel 60 or to remove the applied voltage (switching off).

As shown in the depicted embodiment, the illustrated pixels 60a-60i may be arranged such that their respective pixel electrodes are tilted with respect to the y-axis in an alternating manner along each scanning line (102a-102c) and each data line (100a-100c). For instance, along the scanning line 102a, the unit pixels 60a and 60c may have α-angled pixel electrodes 110a, and the unit pixel 60b may have a β-angled pixel electrode 110b. Thus, for each group of red, blue, green unit pixels coupled to a common scanning line (e.g., 102a), two of the unit pixels within the group may be angled in a first direction with respect to the y-axis (e.g., either α or β), and the remaining unit pixel may be angled in the second direction. Similarly, along the data line 100a, the unit pixels 60a, 60d, and 60g may also be arranged in an alternating manner, wherein the unit pixels 60a and 60g have α-angled pixel electrodes 110a, and the unit pixel 60d has a β-angled pixel electrode 110b.

Additionally, referring to the unit pixels 60j and 60k, a black mask 78 element is illustrated. As discussed above, the black mask 78, which may be light-opaque, may define a light-transmissive aperture over the liquid crystal layer 72 for each of the unit pixels, and may cover or mask portions of the unit pixel 60 that do not transmit light, such as the TFT 112 and the scanning/data line circuitry. Also, in accordance with aspects of the presently described techniques, the black mask 78 may serve to mask disclinations within the liquid crystal layers 72 of adjacent unit pixels 60 that may occur due to interference between electrical fields (E) generated by pixel electrodes 110a and 110b positioned in different-angled (α or β) directions.

As shown in the present embodiment, the edges 140 of the black mask 78 are substantially parallel with both the y-axis and the data lines 100a-100c. Also as discussed above, a color filter 76, which may be a red, green, or blue filter, may be provided within the defined aperture such that each unit pixel 60 corresponds to a particular primary color when light is transmitted therethrough. For illustrative purposes, the black mask 78 is only shown as covering the unit pixels 60j and 60k. In practice, it should be appreciated that the black mask 78 may form a matrix over all the unit pixels within an LCD 34.

Figure 9:
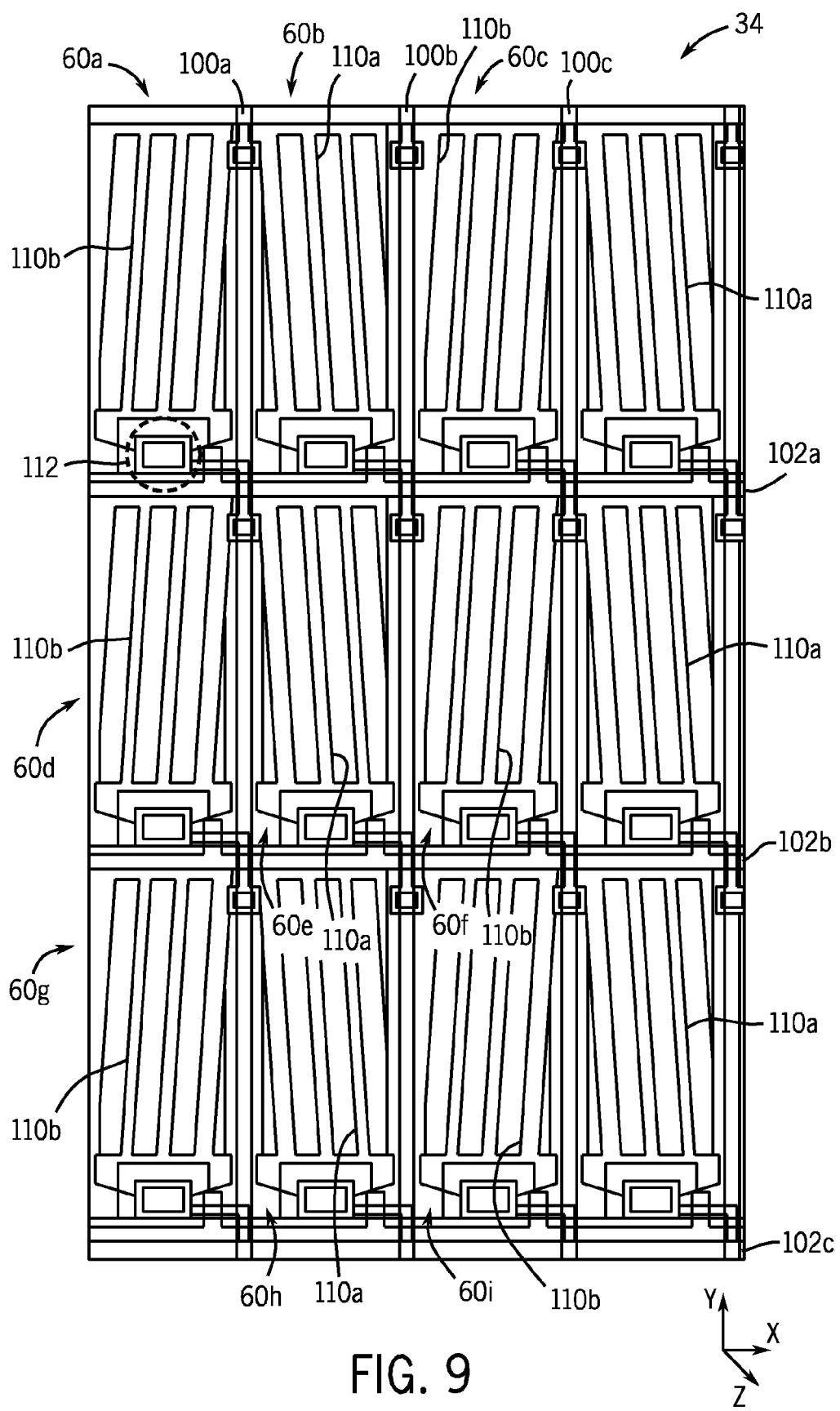
FIG. 9 is a detailed plan view of a portion of an LCD display panel, in accordance with a second embodiment of the present disclosure.

Continuing now to FIG. 9, a further embodiment of a portion of an LCD panel 34 implementing aspects of the presently disclosed techniques is illustrated. The embodiment shown in FIG. 9 is similar to the embodiment of FIG. 8, except that the pixel electrodes 110a and 110b are arranged in an alternating manner along the scanning lines 102a-102c, but are arranged in parallel along each data line 100a-100c.

For instance, the pixel group 60a-60c, which may include each of a red, green, and blue unit pixel, are arranged in a manner similar to that of the embodiment shown in FIG. 8, whereby the unit pixels 60a and 60c have α-angled pixel electrodes 110a, and the unit pixel 60b has a β-angled pixel electrode 110b. In the depicted embodiment, the pixel groups 60d-60f and 60g-60i are arranged in a similar manner.

Along each data line 100a-100c, the unit pixels may be arranged in parallel, such that the pixel electrodes 110 of each unit pixel along a particular data line are angled in the same direction. For instance, as shown in the present figure, each of the unit pixels 60a, 60d, and 60g coupled to the data line 100a and each of the unit pixels 60c, 60f, and 60i coupled to the data line 100c have β-angled pixel electrodes 110b. Similarly, each of the unit pixels 60b, 60e, and 60h coupled to the data line 100b are shown as having α-angled pixel electrodes 110a. Further, though not shown in the present figure, it should be appreciated that the black mask 78 shown in FIG. 8 may also be applied and disposed over the liquid crystal layer 72 of the LCD 34 embodiment shown in FIG. 9.

Figure 10A:
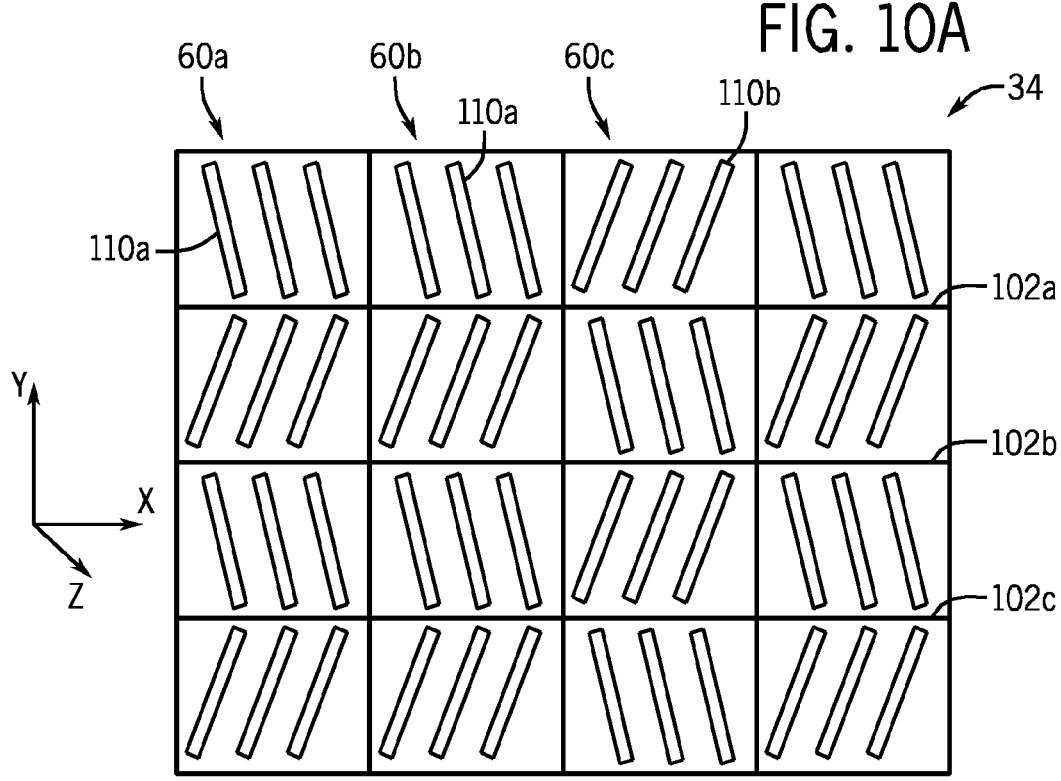
FIGS. 10 and 10B are simplified plan views of a portion of an LCD display panel, in accordance with further embodiments of the present disclosure.
Figure 10B:
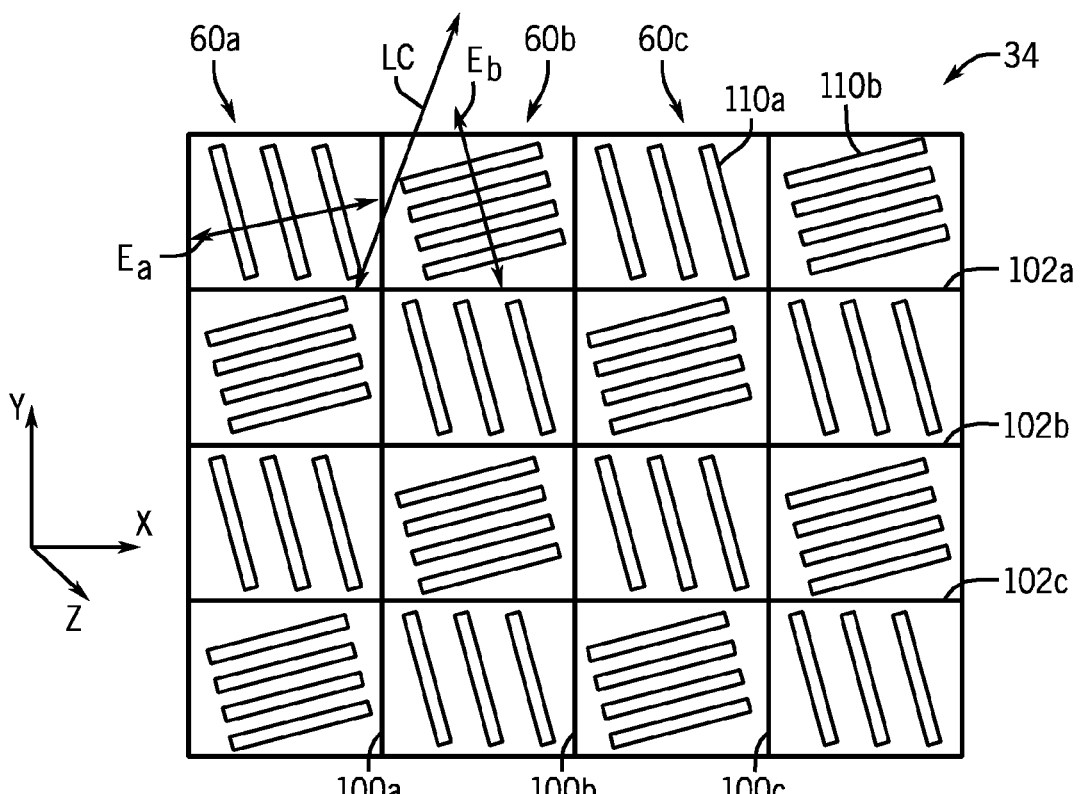

Continuing now to FIGS. 10A and 10B, additional embodiments of the LCD panel 34 in accordance with aspects of the present disclosure are illustrated by way of example using simplified plan views. Referring first to FIG. 10A, the pixel electrodes 110a and 110b are arranged in a periodic manner, but not necessarily alternating with respect to every other pixel within a scanning line (102a-102c). In the depicted embodiment, the unit pixels 60 may be arranged along a scanning line 102a such that within a group of three pixels 60a-60c, which may represent a red, a blue, and a green pixel, two adjacent unit pixels utilize pixel electrodes angled in the same direction, and the remaining unit pixel utilizes a pixel electrode angled in the direction opposite the other two pixels. By way of example, the adjacent unit pixels 60a and 60b are shown in the present figure as having α-angled pixel electrodes 110a, while the remaining unit pixel 60c within the pixel group 60a-60c has a β-angled pixel electrode 110b. The unit pixels 60d-60f in the scanning line 102b directly below the scanning 102a (with respect to the y-axis) may be arranged in an opposite manner. For example, within the pixel group 60d-60f, the adjacent unit pixels 60d and 60e may have β-angled pixel electrodes 110b, while the remaining unit pixel 60f has an α-angled pixel electrode 110a.

As discussed above, in certain embodiments, the magnitude of the angles α and β by which the unit pixels 60 within the LCD panel 34 are tilted with respect to the y-axis may differ in magnitude. For instance, referring to FIG. 10B, a pixel configuration that alternates along the scanning lines 102a-102c and data lines 100a-100c in a manner similar to the arrangement shown in FIG. 8 is illustrated, but with the angle β being greater in magnitude than the angle α. Thus, referring to the pixel group 60a-60c, the unit pixels 60a and 60c may be tilted to a lesser degree with respect to that y-axis when compared to the unit pixel 60b, which may be tilted by a greater degree with respect to the y-axis, but in the direction opposite the unit pixels 60a and 60c. When a voltage is applied to the unit pixels 60a and 60b, the respective electrical fields $E_a$ and $E_b$ may be generated for manipulating liquid crystal molecules to allow for light from the light source 66 (not shown) to at least partially transmit through each respective unit pixel 60a and 60b.

Further, in contrast to conventional LCD panel designs, in which the liquid crystal alignment direction (also commonly referred to as the liquid crystal "rubbing angle") is typically the direction of the vertical or horizontal axis of the panel, the present embodiment shows the liquid crystal layer 72 having an alignment direction LC that is offset at an angle with respect to the y-axis of the illustrated LCD panel 34. In the illustrated embodiment, the magnitude of the angle at which the alignment direction LC is offset from the y-axis may be between the magnitudes of the angles α and β to provide for increased transmittance. By way of example only, the angle α (unit pixel 60a) may have a magnitude of approximately 15°, and the angle β (unit pixel 60b) may have a magnitude of approximately 83°, while the angle at which the alignment direction LC is offset from the y-axis may have a magnitude of approximately 30°.

The presently illustrated configuration having the offset liquid crystal alignment direction LC may provide for certain additional viewing benefits, particularly when the LCD panel 34 is viewed from behind a polarizing medium, such as by a user wearing polarized sunglasses, for instance. In conventional LCD panels, where the liquid crystal alignment direction is in the direction of either the horizontal or vertical axis, a user holding a device (e.g., 30 or 50) in a manner such that an LCD display on the device is oriented vertically or horizontally and simultaneously viewing LCD display from behind the polarized medium (e.g., sunglasses) may perceive the amount of light transmitted through the LCD display (from the light source 66) as being reduced or partially obstructed. Thus, by providing an liquid crystal layer having an alignment direction LC that is offset from the vertical or horizontal axis of the LCD panel 34, the transmittance perceived by a user under such circumstances may be improved.

Before continuing, it should be understood that the present embodiment is provided herein merely by way of example, and that in alternate embodiments, the magnitude of the angle β could be less than the angle α. Further, as shown in FIG. 10B, the electrodes 110a and 110b may include different numbers of electrode strips within a corresponding unit pixel. In the present example, the electrode 110a includes three strips, while the electrode 110b includes four strips. Additionally, it should be appreciated that the black mask 78 shown in FIG. 8 may similarly be applied to the embodiments shown in FIGS. 10A and 10B. In yet further embodiments, multiple angular magnitudes in both the α-direction and the β-direction could be utilized. For instance, in such an embodiment, the unit pixels 60a and 60c may both be angled in the same direction with respect to the y-axis, but by different magnitudes.

Figure 11:
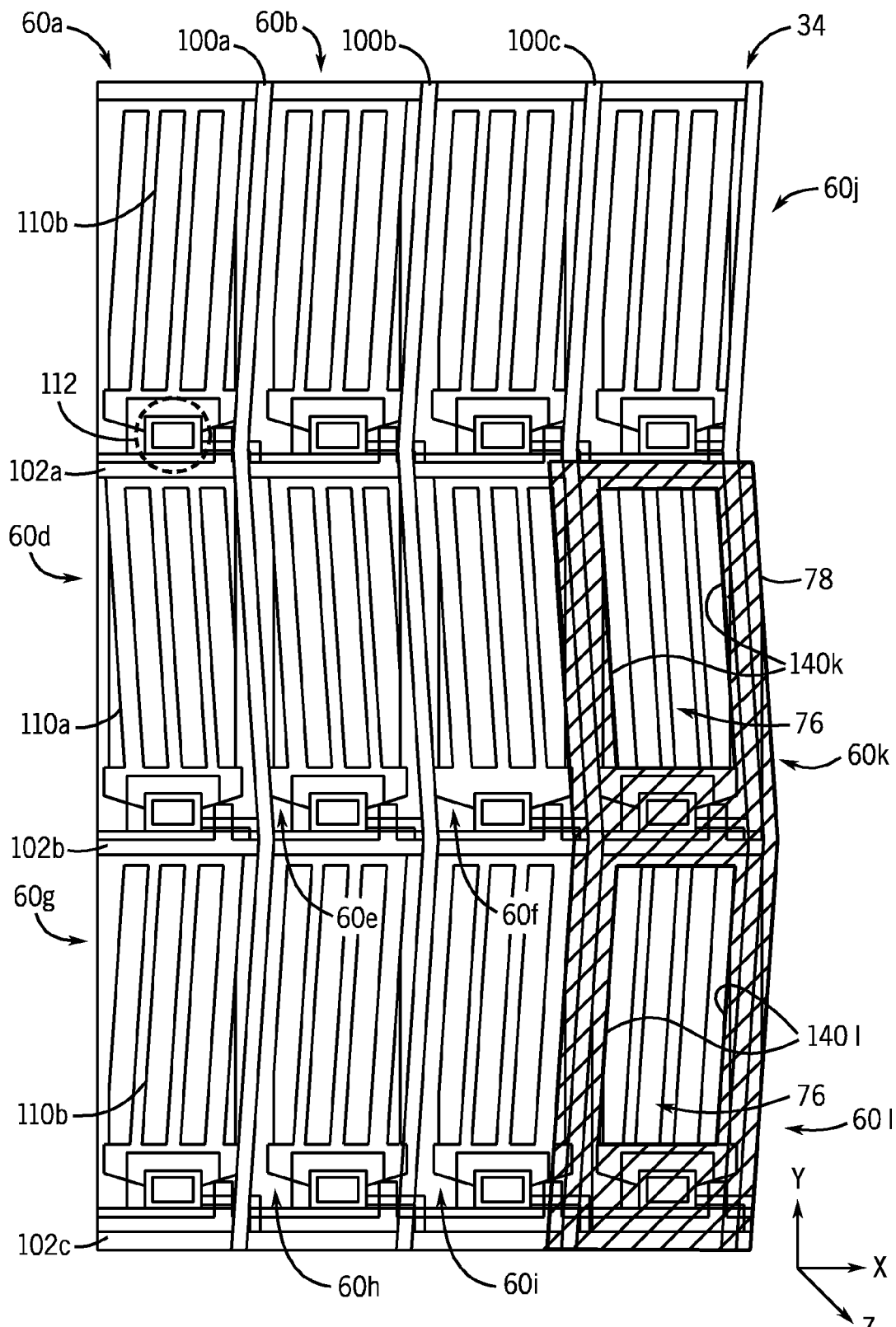
FIG. 11 is a detailed plan view of a portion of an LCD display panel, in accordance with yet a further embodiment of the present disclosure.

Continuing now to FIG. 11, a plan view showing a further embodiment of an LCD panel 34 is illustrated. In the embodiment shown in FIG. 11, the unit pixels 60 coupled to each of the respective scanning lines 102a-102c are angled in the same manner (e.g., α or β), but alternate between every other scanning line (e.g., every other row of the pixel array). For instance, the unit pixels 60a-60c (which may include a red, green, and a blue pixel) coupled to the scanning line 102a and the unit pixels 60g-60i coupled to the scanning line 102c each include β-angled pixel electrodes 110b, while the unit pixels 60d-60f coupled to the scanning line 102b each include α-angled pixel electrodes 110a.

The present embodiment also differs from the above-discussed embodiments in that the data lines 100a-100c are parallel to each other, but not parallel with respect to the y-axis, as shown by the reference axes in FIG. 11. Instead, the data lines 100a-100c are parallel with respect to the pixel electrodes (110a or 110b) coupled to each scanning line 102a-102c, such that the data lines 100a-100c generally form a zigzag structure along the direction of the y-axis. Referring to the data line 110a by way of example, the portion of the data line 100a bordering the unit pixel 60a above the scanning line 102a is parallel to the angle of the pixel electrode 110b. That is, the portion of the data line bordering the unit pixel 60a is also tilted by the angle β with respect to the y-axis. Similarly, the portion of the data line 100a bordering the unit pixel 60d is angled in the opposite direction by the angle α, and is thus parallel to the pixel electrode 110a of the unit pixel 60d. The portion of the data line 100a bordering the unit pixel 60g may be angled in the same manner (by the angle β) as the portion of the data line 110a bordering the unit pixel 60a, as discussed above. Thus, in accordance with the present embodiment, the data lines 100a-100c may be angled or tilted with respect to the y-axis in an alternating manner (e.g., between every other scanning line), such that the data lines 100a-100c are parallel to the pixel electrodes (110a or 110b) of bordering unit pixels between each scanning line 102a-102c.

Additionally, a modified black mask structure 78 may be utilized with the embodiment shown in FIG. 11. By way of example, referring to the unit pixel 60k, the edges 140k (with respect to the y-axis) of the aperture defined by the black mask 78 are not parallel to the y-axis. Rather, the edges 140k are angled via α such that the edges 140k are parallel with the pixel electrode 110a within the unit pixel 60k, as well as the angled portions of the data lines 110a, 110b, and 110c between the scanning lines 102a and 102b. Similarly, the portion of the black mask structure 78 over the liquid crystal layer 72 of the unit pixel 60l is shown as having an aperture with edges 140l angled via β, such that the edges 140l are parallel with the pixel electrode 110b within the unit pixel 60l, as well as the angled portions of the data lines 110a, 110b, and 110c between the scanning lines 102b and 102c. Additionally, as explained above, where the LCD panel 34 is a colored display, respective color filters 76 (e.g., red, blue, or green) may be disposed within each of the apertures defined by the black mask 78.

The presently disclosed techniques, which have been explained by way of the various exemplary embodiments described above, may be utilized in a variety of LCD devices, particularly fringe field switching (FFS) LCD devices. As will be appreciated, an LCD device utilizing the "pseudo-multi-domain" configurations described herein may retain the benefits of both single-domain and multi-domain pixel configuration devices. For instance, a result of using the single-domain pixel configuration of the unit pixels in accordance with the present technique may be the maintenance of the relatively higher transmittance rates typical of conventional single-domain LCD panels (as opposed to multi-domain panel transmittance rates). Particularly, the use of single-domain pixel configurations throughout the LCD panel may prevent unwanted disclinations, which typically are present in multi-domain pixel designs (due, for example, to interference between electrical fields in differing directions), from occurring within the areas of transmittance of each unit pixel. As mentioned above, such disinclinations may reduce the amount of light that is transmitted through each unit pixel, and thus reduce the overall transmittance of the LCD. Additionally, the alternating and/or periodic arrangement of different-angled pixel electrodes (e.g., by the angles α or β) within each of the single-domain unit pixels may generally provide for improved viewing angle and color shift properties typical of conventional multi-domain LCD panels. Additionally, those skilled in the art will appreciate that the LCD panels incorporating one or more of the foregoing techniques may be manufactured using any type of suitable layer deposition process, such as chemical vapor deposition (CVD or PECVD).

While the present invention may be susceptible to various modifications and alternative forms, specific embodiments have been shown by way of example in the drawings and will be described in detail herein. However, it should be understood that the techniques set forth in the present disclosure are not intended to be limited to the particular forms disclosed. Rather, the invention is to cover all modifications, equivalents and alternatives falling within the spirit and scope of the disclosure as defined by the following appended claims.

What is claimed is:

1. A liquid crystal display (LCD) panel, comprising:
a pixel array having a plurality of unit pixels, each being in a single-domain configuration, comprising:
a first set of unit pixels, wherein each of the first set of unit pixels comprises electrodes generally parallel to one another; and
a second set of unit pixels, wherein each of the second set of unit pixels comprises electrodes generally parallel to one another, but not generally parallel to the electrodes of the first set of unit pixels, wherein the electrodes of the first set of unit pixels are tilted by a first angle in a first angular direction with respect to a vertical axis of the LCD panel, and wherein the electrodes of the second set of unit pixels are tilted by a second angle in a second angular direction with respect to the vertical axis, and wherein the first and second angular directions are opposite from each other, wherein the magnitudes of the first and second angles are not substantially equal;
wherein the plurality of unit pixels are arranged in a plurality of groups, wherein each group comprises three directly adjacent unit pixels coupled to a common scanning line, wherein the three unit pixels comprise a red unit pixel, a blue unit pixel, and a green unit pixel, and wherein the three unit pixels within each group comprise either two unit pixels from the first set and one unit pixel from the second set, or one unit pixel from the first set and two unit pixels from the second set.

2. The LCD panel of claim 1, wherein the two unit pixels from the first set or the two unit pixels from the second set are directly adjacent along the common scanning line.

3. The LCD panel of claim 1, wherein the magnitudes of the first and second angles are substantially equal.

4. The LCD panel of claim 1, wherein the magnitude of the first angle is greater than 0° with respect to the vertical axis, and wherein the magnitude of the second angle is less than 90° with respect to the vertical axis.

5. The LCD panel of claim 1, wherein the magnitude of the first angle is greater than 0° with respect to the vertical axis, and wherein the magnitude of the second angle is less than or equal to 15° with respect to the vertical axis.

6. The LCD panel of claim 1, wherein the magnitude of the first angle is greater than or equal to 75° with respect to the vertical axis, and wherein the magnitude of the second angle is less than 90° with respect to the vertical axis.

7. The LCD panel of claim 1, wherein the magnitude of the first and second angles have a range from 15° to 75°.

8. The LCD panel of claim 1, wherein the plurality of unit pixels in the pixel array are arranged in rows and columns, and wherein the first and second set of unit pixels are arranged such that the unit pixels from the first and second sets alternate along a row, alternate along a column, or alternate along rows and columns of the pixel array.

9. The LCD panel of claim 1, wherein the electrodes of the first and second set of unit pixels comprise one or more of indium tin oxide or indium zinc oxide.

10. The LCD panel of claim 1, wherein the LCD panel comprises a fringe field switching (FFS) LCD panel.

11. The LCD panel of claim 1, wherein the LCD panel comprises a light-opaque matrix defining a light-transmissive aperture over each of the plurality of unit pixels, and wherein each of the apertures includes a color filter, and wherein the red, blue, and green unit pixels of each group of unit pixels are determined by a corresponding color filter associated with a respective aperture.

12. A liquid crystal display (LCD) panel, comprising:
a pixel array having a plurality of unit pixels arranged in a rows and columns defined by scanning lines and data lines, respectively, the pixel array comprising:
a first set of unit pixels, wherein each of the first set of unit pixels comprises electrodes generally parallel to one another but not generally parallel to a vertical axis of the LCD panel; and
a second set of unit pixels, wherein each of the second set of unit pixels comprises electrodes generally parallel to one another, but not generally parallel to the electrodes of the first set of unit pixels or the vertical axis, wherein the electrodes of the first set of unit pixels are tilted by a first angle in a first angular direction with respect to the vertical axis, and wherein the electrodes of the second set of unit pixels are tilted by a second angle in a second angular direction with respect to the vertical axis, and wherein the first and second angular directions are opposite from each other, wherein the magnitudes of the first and second angles are not substantially equal;
wherein the scanning lines comprise a first set of scanning lines and a second set of scanning lines, and wherein each of the first set of unit pixels is coupled to one of the first set of scanning lines and respective data lines, and wherein each of the unit pixels from the second set of unit pixels is coupled to one of a second set of scanning lines and respective data lines, wherein the first and second sets of scanning lines are arranged in an alternating manner along the vertical axis of the LCD panel, and wherein each of the data lines are oriented such that the portions of each data line disposed between adjacent scanning lines are generally parallel to the electrodes of directly adjacent unit pixels.

13. The LCD panel of claim 12, wherein the plurality of unit pixels are arranged in groups of three directly adjacent unit pixels coupled to a common one of the scanning lines, wherein the three unit pixels comprise a red unit pixel, a blue unit pixel, and a green unit pixel.

14. The LCD panel of claim 12, wherein each of the data lines forms a generally zigzag shape generally along the vertical axis of the LCD panel.

15. The LCD panel of claim 12, comprising driving circuitry configured to transmit image data to the scanning lines and to the data lines.

16. The LCD panel of claim 12, comprising a light-opaque matrix defining a light-transmissive aperture over each of the first and second sets of unit pixels, wherein edges of each aperture in the direction of the vertical axis are generally parallel to the electrodes of its respective unit pixel.

17. The LCD panel of claim 16, wherein the light-opaque matrix masks disclinations between directly adjacent unit pixels coupled to either directly adjacent scanning lines or to directly adjacent data lines.

18. The LCD panel of claim 12, wherein the electrodes of each of the plurality of unit pixels have a single-domain configuration.

19. A method for displaying image data in a liquid crystal display (LCD) panel having an array of unit pixels arranged in rows and columns defined by scanning lines and data lines, respectively, the method comprising:

supplying a data signal representative of at least a portion of the image data to each of the data lines; and supplying a scanning signal to each of the scanning lines, wherein the scanning lines comprises a first set of scanning lines and a second set of scanning lines, wherein the first set of scanning lines is coupled to a first set of unit pixels having pixel electrodes oriented at a first angle with respect to a vertical axis of the LCD panel in a first angular direction, wherein the second set of scanning lines is coupled to a second set of unit pixels having pixel electrodes oriented at a second angle with respect to the vertical axis in a second angular direction, wherein the magnitudes of the first and second angles are not substantially equal, and wherein the first and second sets of scanning lines are arranged in an alternating manner along the vertical axis;

wherein the first and second angular directions are opposite from each other, and wherein each data line has a generally zigzag generally shape along the vertical axis and is oriented such that the portions of each data line between adjacent scanning lines are generally parallel to the electrodes of directly adjacent unit pixels.

20. The method of claim 19, wherein the data signals are supplied to the data lines in a sequential manner.

21. The method of claim 19, wherein, when activated, each of the unit pixels from the first set generates an electrical field in a first direction and each of the unit pixels from the second set generates an electrical field in a second direction.

22. The method of claim 21, comprising masking disclinations resulting from interference between the first and second electric fields using a light-opaque matrix defining a light-transmissive aperture over each of the unit pixels of within the LCD panel.

23. A method for masking disclinations in a liquid crystal display (LCD) panel, comprising:

providing a light-opaque material disposed over a pixel array comprising a plurality of unit pixels arranged in rows and columns defined by scanning lines and data lines, respectively, the plurality of unit pixels comprising:

a first set of unit pixels having pixel electrodes oriented in a first angular direction at a first angle with respect to a vertical axis of the LCD panel and configured to generate an electrical field in a first direction; and a second set of unit pixels having pixel electrodes oriented in a second angular direction opposite the first angular direction and at a second angle with respect to the vertical axis and configured to generate an electrical field in a second direction;

wherein an electrical field in the first direction and an electrical field in the second direction respectively generated by two directly adjacent unit pixels, including one unit pixel from the first set and one unit pixel from the second set, interfere with each other and cause one or more disclinations to form between the directly adjacent unit pixels, the one or more disclinations at least partially preventing light provided from a light source from being transmitted through the first unit pixel or the second unit pixel;

wherein the light-opaque material forms a matrix defining a light-transmissive aperture bordered by the light-opaque material over each of the plurality of unit pixels, wherein the light-opaque borders corresponding to the directly adjacent unit pixels mask the one or more disclinations.

24. The method of claim 23, wherein the light source comprises one of a backlight assembly or a light-reflective surface.

25. The method of claim 23, wherein unit pixels coupled to a common one of the scanning lines within the pixel array are arranged in groups of three unit pixels, each group comprising a red unit pixel, a blue unit pixel, and a green unit pixel.

26. The method of claim 23, wherein each group of unit pixels comprises either two unit pixels from the first set and one unit pixel from the second set, or one unit pixel from the first set and two unit pixels from the second set.

27. The method of claim 23, wherein the unit pixels coupled to a respective data line are all from the first set of unit pixels or all from the second set of unit pixels.

28. The method of claim 23, wherein the unit pixels coupled to a respective data line alternate between a unit pixel from the first set and a unit pixel from the second set.

29. A liquid crystal display (LCD) panel, comprising:

a pixel array having a plurality of unit pixels comprising:

a first set of unit pixels having substantially straight pixel electrodes oriented in a first angular direction at a first angle that is less than 90 degrees with respect to a vertical axis of the LCD panel; and a second set of unit pixels having substantially straight pixel electrodes oriented in a second angular direction opposite the first angular direction and at a second angle that is less than 90 degrees with respect to the vertical axis;

wherein the magnitudes of the first and second angles are not equal; and a liquid crystal layer comprising a plurality of liquid crystal molecules disposed between a lower alignment layer and an upper alignment layer, wherein the lower and upper alignment layers are configured to align the liquid crystal layer in a direction that is offset from the vertical axis of the LCD panel by a third angle having a magnitude that is between the magnitudes of the first and the second angles.

30. The LCD panel of claim 29, wherein the plurality of unit pixels in the pixel array are arranged in rows and columns, and wherein the first and second set of unit pixels are arranged such that the unit pixels from the first and second sets alternate along a row, alternate along a column, or alternate along rows and columns of the pixel array.

31. The LCD panel of claim 29, wherein the liquid crystal molecules of the liquid crystal layer are disposed in one of a fluid material or a polymer network.

32. The LCD panel of claim 29, wherein the upper and lower alignment layers and the liquid crystal layer are disposed over the pixel electrodes, and wherein the LCD panel comprises a light source disposed under the pixel array and configured to transmit light through liquid crystal layer.

33. The LCD panel of claim 32, wherein, when oriented in a vertical or horizontal position and viewed through a polarized medium, the LCD panel having the liquid crystal layer aligned at the third angle is perceived as having a higher transmittance rate relative to an LCD panel having a liquid crystal layer aligned in a direction parallel to either the horizontal or vertical axis of the LCD panel.

* * * * *